(12) United States Patent
Ichitani et al.

(10) Patent No.: US 8,500,926 B2
(45) Date of Patent: Aug. 6, 2013

(54) ALUMINUM ALLOY MATERIAL FOR HIGH-TEMPERATURE/HIGH-SPEED MOLDING, METHOD OF PRODUCING THE SAME, AND METHOD OF PRODUCING A MOLDED ARTICLE OF AN ALUMINUM ALLOY

(75) Inventors: Koji Ichitani, Tokyo (JP); Tsutomu Tagata, Tokyo (JP); Toshio Komatsubara, Tokyo (JP); Ken Takata, Tokyo (JP)

(73) Assignees: Furukawa-Sky Aluminum Corp, Tokyo (JP); Nippon Steel & Sumitomo Metal Corporation, Tokyo (JP)

( * ) Notice: Subject to any disclaimer, the term of this patent is extended or adjusted under 35 U.S.C. 154(b) by 0 days.

(21) Appl. No.: 12/171,380
(22) Filed: Jul. 11, 2008
(65) Prior Publication Data
US 2008/0257462 A1    Oct. 23, 2008

Related U.S. Application Data (63) Continuation of application No. PCT/JP2007/050276, filed on Jan. 11, 2007.

(30) Foreign Application Priority Data

Jan. 12, 2006  (JP) ................................. 2006-005406
Jan. 12, 2006  (JP) ................................. 2006-005415

(51) Int. Cl.
*C22F 1/047* (2006.01)
*C22C 21/08* (2006.01)

(52) U.S. Cl.
USPC ............ 148/440; 148/692; 148/695; 420/544

(58) Field of Classification Search
USPC ................. 148/440, 439, 692, 691, 695, 696; 420/544

See application file for complete search history.

(56) References Cited

U.S. PATENT DOCUMENTS 5,181,969 A    1/1993   Komatsubara et al.
5,540,791 A *  7/1996   Matsuo et al. ................ 148/549
6,261,391 B1   7/2001   Ikeda et al.

FOREIGN PATENT DOCUMENTS

JP    60-238461 A    11/1985
JP    63-286546 A    11/1988

(Continued)

OTHER PUBLICATIONS

Horie, Shiro et al.; "Effect of homogenizing and heating treatment condition before working on hot workability of 5083 alloy"; Light metals, Japan, 1977, vol. 27. , No. 12, pp. 579 to 583. (cited in Japanese Office Action dated Jul. 26, 2011, issued in corresponding Japanese Patent Application No. 2006-005406).

(Continued)

*Primary Examiner* — Roy King
*Assistant Examiner* — Janelle Morillo
(74) *Attorney, Agent, or Firm* — Westerman, Hattori, Daniels & Adrian, LLP

(57) ABSTRACT

An aluminum alloy material for high-temperature/high-speed molding containing 2.0 to 8.0 mass % of Mg, 0.05 to 1.0 mass % of Mn, 0.01 to 0.3 mass % of Zr, 0.06 to 0.4 mass % of Si and 0.06 to 0.4 mass % of Fe, with the balance being made of aluminum and inevitable impurities; an aluminum alloy material for high-temperature/high-speed molding containing 2.0 to 8.0% of Mg, 0.05 to 1.5% of Mn and 0.05 to 0.4% of Cr, Fe being restricted to 0.4% or less and Si being restricted to 0.4% or less, the grain diameter of a Cr-base intermetallic compound formed by melt-casting being 20 μm or less, and grains of intermetallic compounds with a grain diameter in the range from 50 to 1,000 nm as Mn-base and Cr-base precipitates being present in a distribution density of 350,000 grains/mm² or more, the aluminum alloy material being used for high-temperature/high-speed molding by subjecting the alloy material to cooling at a cooling rate of 20° C./min or more immediately after molding at a temperature range from 200 to 550° C. and at a strain rate from $10^{-2}$ to 10/sec; and a method of producing the aluminum alloy material.

12 Claims, 1 Drawing Sheet

FOREIGN PATENT DOCUMENTS

| | | |
|---|---|---|
| JP | 01-301831 A | 12/1989 |
| JP | 04-176848 A | 6/1992 |
| JP | 4-218635 A | 8/1992 |
| JP | 04-318145 A | 9/1992 |
| JP | 2831157 B2 | 9/1992 |
| JP | 05-247576 A | 9/1993 |
| JP | 06-136497 A | 5/1994 |
| JP | 08-020833 A | 1/1996 |
| JP | 08-199272 A | 8/1996 |
| JP | 08-209281 A | 8/1996 |
| JP | 09-059736 A | 3/1997 |
| JP | 3145904 B2 | 3/1997 |
| JP | 10-259441 A | 9/1998 |
| JP | 2000-237882 A | 9/2000 |
| JP | 2001-164331 A | 6/2001 |
| JP | 2001-294964 A | 10/2001 |
| JP | 2003-342665 A | 12/2003 |
| JP | 2004-225114 A | 8/2004 |
| JP | 2004-285390 A | 10/2004 |
| JP | 2005-307300 A | 11/2005 |
| WO | WO 2005103313 A1 * | 11/2005 |

OTHER PUBLICATIONS

Kazama, Hitoshi et al.; "Development of Al—Mg-seties alloy sheet for high cycle blow forming"; Summary of lecture in meeting of the Japan Institute of Lights Metals, Japan, Apr. 28, 2005, vol. 108, pp. 61 to 62. (cited in Japanese Office Action dated Jul. 26, 2011, issued in corresponding Japanese Patent Application No. 2006-005406).

* cited by examiner

US 8,500,926 B2

ALUMINUM ALLOY MATERIAL FOR HIGH-TEMPERATURE/HIGH-SPEED MOLDING, METHOD OF PRODUCING THE SAME, AND METHOD OF PRODUCING A MOLDED ARTICLE OF AN ALUMINUM ALLOY

TECHNICAL FIELD

The present invention relates to an aluminum alloy material used for high-temperature/high speed molding. The aluminum alloy material is suitable for producing an aluminum alloy member, which has a complex shape that is difficult to form by cold pressing while a high strength is required, by high-temperature/high-speed molding.

The present invention also relates to an aluminum alloy material used for high-temperature/high speed molding and a method of producing the aluminum alloy material. The aluminum alloy material is suitable for molding an aluminum alloy member, which has a complex shape that is difficult to form by cold pressing while a molded article is required to have excellent strength and fatigue characteristics, by high-temperature/high-speed molding.

BACKGROUND ART

Al—Mg-base aluminum alloys have been known to express a superplastic phenomenon that shows an elongation of as high as 300% at a strain rate of about $10^{-3}$/sec in a high temperature region. The aluminum alloy is molded into an arbitrary shape, for example so as to follow a die having an arbitrary shape, by taking advantage of this feature by a gas pressure after heating an aluminum alloy sheet at a high temperature. In a known art on an aluminum alloy sheets for superplastic molding, a molded article having a complex shape, which is difficult to produce by conventional press molding at room temperature, may be obtained by using the aluminum alloy sheet (for example, see Japanese Patent Publication No. 2,831,157).

More recently, an art on high-temperature/high-speed and molding that largely enhances productivity has been disclosed, wherein the strain rate has been increased one digit or more, for example in the range from $10^{-2}$ to 1/sec (for example, see JP-A-8-199272 ("JP-A" means unexamined published Japanese patent application), JP-A-10-259441, JP-A-2003-342665, JP-A-2004-225114 and JP-A-2004-285390, and Japanese Patent Publication No. 3,145,904).

In high temperature molding applied in a region where the strain rate is high in recent years, crystal structures are controlled during high-temperature/high speed molding in order to secure better high-temperature/high-speed moldability. For example, JP-A-8-199272 discloses an art for preventing crystal grains from being abnormally grown during high temperature molding by adding an appropriate amount of one or plural elements of Mn, Cr, Zr, V, Ti and B.

JP-A-10-259441 discloses an art for fining recrystallized grains in recrystallization of an alloy during high-temperature deformation by adding an appropriate amount of one or plural elements of Mn, Cr and Zr. JP-A-2003-342665 further discloses an art for giving good moldability and good appearance after molding while enhancing the strength after molding by stabilizing recrystallization that occurs during high-temperature deformation by adding an appropriate amount of one or both of Mn and Cr.

The crystal structure has been controlled in the conventional art of high-temperature/high speed molding by adding an appropriate amounts of various transition elements represented by Mn and Cr.

Slip at crystal grain boundaries is a major mechanism of deformation in superplastic molding in which an Al—Mg-base aluminum alloy is molded at a strain rate of $10^{-3}$/s, and it has been known that elongation by superplastic molding is larger as crystal grains of the material before molding are finer. In Japanese Patent Publication No. 2,831,157 on superplastic molding, for example, the average crystal grain size is prescribed to be 20 μm or less for securing high superplastic moldability.

On the other hand, subgrains are formed in the crystal grain that constitutes the aluminum alloy in high-temperature/high speed molding applied in a strain rate region as high as from $10^{-2}$ to 1/s during molding. The term "subgrain" as used herein refers to grains composed of grain boundaries (referred to subgrain boundaries) with a grain boundary angles of less than 15° within usual crystal grains composed of crystal grain boundaries with a grain boundary angle (the difference of orientation between adjoining grains) of 15° or more. The subgrain structure formed during molding seems to strongly affect high-temperature/high-speed moldability and the strength of the molded articles after molding. However, it has not been examined in conventional Al—Mg-base aluminum alloys what is the configuration of the optimum subgrain structures for high-temperature/high-speed moldability. For example, JP-A-8-199272 prescribes the average crystal grain diameter of the material before molding to be in the range from 15 to 120 μm, and discloses to add appropriate amounts of Mn, Cr, Zr and the like in order to prevent crystal grains from being abnormally grown by high-temperature/high-speed molding. However, the patent only describes the crystal grain structure, and no examination on the subgrain structure is disclosed. Likewise, JP-A-10-259441 prescribes the average crystal grain diameter in the range from 20 to 200 μm, and discloses to add appropriate amounts of Mn, Cr, Zr and the like for fining crystal grains by recrystallization of the alloy during high-temperature deformation. However, these descriptions are only related to the crystal grains.

Furthermore, the deformation mechanism of the Al—Mg-base aluminum alloy in high-temperature/high speed molding has not been sufficiently elucidated, and it remains unknown what crystal structure is most suitable and what method for controlling the structure is necessary in order to obtain high-temperature/high-speed moldability and in order to enhance the strength of the molded article. Consequently, troubles that have been often encountered in the production site for producing the molded article by taking advantage of the high-temperature/high-speed molding art include breakage of the material in the course of molding or insufficient strength of the product after molding depending on the conditions such as molding temperatures and strain rate.

When excess amounts of Mn and Cr are added for the above-mentioned objects, Cr-base giant intermetallic compounds may be formed during melt-casting, and moldability has been often deteriorated by mingling of the giant intermetallic compound since the Cr-base intermetallic compound may serve as an origin of breakage. This molded article cannot be used for a member, for example a member of a transport machine, that suffers from repeated loads since fatigue characteristics of the molded article obtained are largely decreased, even when high-temperature/high speed molding was successful.

DISCLOSURE OF INVENTION

The present invention performed on the basis of above-mentioned situations has examined the relation between the subgrain structure, which is formed within crystal grains during high temperature deformation of the Al—Mg base aluminum alloy, and high-temperature/high-speed moldability of the aluminum alloy and the strength of the molded article after molding. Accordingly, a task of the present invention is to provide an aluminum alloy material having a specified optimum alloy composition that is able to form a subgrain structure capable of making high-temperature/high speed moldability and high strength after molding to be compatible to one another, and to provide a production method of the aluminum alloy member.

Another task of the present invention is to provide an aluminum alloy material capable of obtaining a molded article excellent in the strength and fatigue characteristics after molding and having a specified alloy composition excellent in high-temperature/high-speed moldability, and to provide a production method of the aluminum alloy. In addition, a different task of the present invention is to provide a production method of a molded article of the aluminum alloy member.

The results of examination on the effect of the subgrain structure on high-temperature/high-speed moldability showed that the aluminum alloy exhibits higher high-temperature/high-speed molding elongation when the subgrain structures are finely developed, as compared with an aluminum alloy having a structure in which subgrains were extinguished by generating successive recrystallization during high-temperature/high-speed molding. It was also elucidated that the strength of the molded article after high-temperature/high-speed molding is higher when the subgrain structure is finely developed, as compared with the strength of the molded article in which the subgrain has been extinguished by recrystallization during high-temperature/high-speed molding or after molding. It was also elucidated that grains of intermetallic compounds in which transition elements such as Mn and Zr are finely dispersed are required to be uniformly and densely contained in a matrix in order to permit the subgrain structure that has developed during high-temperature/high-speed deformation to exist at a high temperature without recrystallization.

The inventors of the present invention have intensively examined the amounts and combinations of various transition elements necessary for stabilizing the subgrain structure based on above-mentioned information, and found that intermetallic compounds of these transition elements are uniformly and densely distributed by adding appropriate mounts of Mn and Zr together.

Then, the inventors of the present invention have intensively examined a high-temperature/high-speed deformation mechanism of the aluminum alloy material and a mechanism for forming Cr-base coarse intermetallic compounds in order to obtain better high-temperature/high-speed moldability, to enhance strength of the molded article and to improve fatigue strength.

With respect to the deformation mechanism, subgrain structures are formed within the crystal grain during deformation in high-temperature/high-speed deformation that occurs at a strain rate of $10^{-2}$/sec or more in the temperature range from 200 to 550° C. It was elucidated that the subgrain structure contributes high-temperature/high-speed elongation by allowing rotation of the subgrain to superpose boundary sliding and intra-grain deformation. The subgrain structure not only enhances high-temperature/high-speed moldability but also contributes for improving the strength after molding by reinforcing respective crystal grains. On the other hand, the subgrain structure is readily extinguished by recrystallization during high-temperature/high-speed molding and in the cooling process after molding, and the effects for improving high-temperature/high-speed moldability and for improving the strength of the molded article that are brought by forming the subgrain structure are lost.

The inventors of the present invention have also found that the subgrain structure may be stabilized during high-temperature/high-speed molding and in the cooling process after molding by properly controlling configuration of distribution of precipitates composed of these elements and Al when appropriate amounts of Mn and Cr are added together.

With respect to Cr-base giant intermetallic compounds formed during melt-casting, it was found that the Cr-base giant intermetallic compound tends to be readily formed when Ti added as a crystal grain fining material exists in excess, and that the giant intermetallic compound may be suppressed from being formed by restricting the amount of Ti below a given level.

The inventors of the present invention have completed the present invention by careful examination of the amounts of addition of respective elements, grain diameters of the precipitates and configuration of distribution related to the distribution density.

The present invention provides the following means:

(1) an aluminum alloy material for high-temperature/high-speed molding containing 2.0 to 8.0 mass % of Mg, 0.05 to 1.0 mass % of Mn, 0.01 to 0.3 mass % of Zr, 0.06 to 0.4 mass % of Si and 0.06 to 0.4 mass % of Fe, with the balance being made of aluminum and inevitable impurities;

(2) an aluminum alloy material for high-temperature/high-speed molding containing 2.0 to 8.0 mass % of Mg, 0.05 to 1.0 mass % of Mn, 0.01 to 0.3 mass % of Zr, 0.06 to 0.4 mass % of Si and 0.06 to 0.4 mass % of Fe, and further containing one or plural elements of 0.05 to 0.5 mass % of Cr, 0.01 to 0.1 mass % of V, 0.01 to 0.4 mass % of Sc, 0.001 to 0.1 mass % of Ti, 0.0001 to 0.05 mass % of B and 0.0001 to 0.01 mass % of Be, with the balance being made of aluminum and inevitable impurities;

(3) an aluminum alloy material for high-temperature/high-speed molding containing 2.0 to 8.0 mass % of Mg, 0.05 to 1.0 mass % of Mn, 0.01 to 0.3 mass % of Zr, 0.06 to 0.4 mass % of Si, 0.06 to 0.4 mass % of Fe and 0.05 to 1.0 mass % of Cu, with the balance being made of aluminum and inevitable impurities;

(4) an aluminum alloy material for high-temperature/high-speed molding containing 2.0 to 8.0 mass % of Mg, 0.05 to 1.0 mass % of Mn, 0.01 to 0.3 mass % of Zr, 0.06 to 0.4 mass % of Si, 0.06 to 0.4 mass % of Fe and 0.05 to 1.0 mass % of Cu, and further containing one or plural elements of 0.05 to 0.5 mass % of Cr, 0.01 to 0.1 mass % of V, 0.01 to 0.4 mass % of Sc, 0.001 to 0.1 mass % of Ti, 0.0001 to 0.05 mass % of B and 0.0001 to 0.01 mass % of Be, with the balance being made of aluminum and inevitable impurities;

(5) the aluminum alloy material for high-temperature/high-speed molding according to any one of (1) to (4), wherein intermetallic compounds with a diameter from 10 to 1,000 nm as Mn-base and Zr-base precipitates exist at a distribution density of 300,000 grains/mm$^2$ or more;

(6) the aluminum alloy material for high-temperature/high-speed molding according to any one of (1) to (5), which is used for high-temperature/high-speed molding in which the aluminum alloy material is cooled to room temperature at a cooling rate of 20° C./min or more immediately after molding at a temperature from 200 to 550° C. and at a strain rate from $10^{-2}$ to 10/sec;

(7) a method of producing a high-temperature/high-speed aluminum alloy material, comprising at least the steps of: subjecting an aluminum alloy ingot, which contains 2.0 to 8.0 mass % of Mg, 0.05 to 1.0 mass % of Mn, 0.01 to 0.3 mass % of Zr, 0.06 to 0.4 mass % of Si and 0.06 to 0.4 mass % of Fe, with the balance being made of aluminum and inevitable impurities, to a homogenizing treatment at a temperature from 350 to 550° C. from 1 to 48 hours; and subjecting the alloy ingot after applying the homogenizing treatment to both or any one of hot working and cold working, thereby allowing grains of intermetallic compounds with a diameter from 10 to 1000 nm to exist as Mn-base and Zr-base precipitates at a distribution density of 300,000 grains/mm$^2$ or more in the aluminum alloy material;

(8) a method of producing a high-temperature/high-speed aluminum alloy material, comprising at least the steps of: subjecting an aluminum alloy ingot, which contains 2.0 to 8.0 mass % of Mg, 0.05 to 1.0 mass % of Mn, 0.01 to 0.3 mass % of Zr, 0.06 to 0.4 mass % of Si and 0.06 to 0.4 mass % of Fe, and further contains one or plural elements of 0.05 to 0.5 mass % of Cr, 0.01 to 0.1 mass % of V, 0.01 to 0.4 mass % of Sc, 0.001 to 0.1 mass % of Ti, 0.0001 to 0.05 mass % of B and 0.0001 to 0.01 mass % of Be, with the balance being made of aluminum and inevitable impurities, to a homogenizing treatment at a temperature from 350 to 550° C. from 1 to 48 hours; and subjecting the alloy ingot after applying the homogenizing treatment to both or any one of hot working and cold working, thereby allowing grains of intermetallic compounds with a diameter from 10 to 1000 nm to exist as Mn-base and Zr-base precipitates at a distribution density of 300,000 grains/mm$^2$ or more in the aluminum alloy material;

(9) a method of producing a high-temperature/high-speed aluminum alloy material, comprising at least the steps of: subjecting an aluminum alloy ingot, which contains 2.0 to 8.0 mass % of Mg, 0.05 to 1.0 mass % of Mn, 0.01 to 0.3 mass % of Zr, 0.06 to 0.4 mass % of Si, 0.06 to 0.4 mass % of Fe and 0.05 to 1.0 mass % of Cu, and further contains one or plural elements of 0.05 to 0.5 mass % of Cr, 0.01 to 0.1 mass % of V, 0.01 to 0.4 mass % of Sc, 0.001 to 0.1 mass % of Ti, 0.0001 to 0.05 mass % of B and 0.0001 to 0.01 mass % of Be, with the balance being made of aluminum and inevitable impurities, to a homogenizing treatment at a temperature from 350 to 550° C. from 1 to 48 hours; and subjecting the alloy ingot after applying the homogenizing treatment to both or any one of hot working and cold working, thereby allowing grains of intermetallic compounds with a diameter from 10 to 1000 nm to exist as Mn-base and Zr-base precipitates at a distribution density of 300,000 grains/mm$^2$ or more in the aluminum alloy material;

(10) a method of producing a high-temperature/high-speed aluminum alloy material, comprising at least the steps of: subjecting an aluminum alloy ingot, which contains 2.0 to 8.0 mass % of Mg, 0.05 to 1.0 mass % of Mn, 0.01 to 0.3 mass % of Zr, 0.06 to 0.4 mass % of Si, 0.06 to 0.4 mass % of Fe and 0.05 to 1.0 mass % of Cu, and further contains one or plural elements of 0.05 to 0.5 mass % of Cr, 0.01 to 0.1 mass % of V, 0.01 to 0.4 mass % of Sc, 0.001 to 0.1 mass % of Ti, 0.0001 to 0.05 mass % of B and 0.0001 to 0.01 mass % of Be, with the balance being made of aluminum and inevitable impurities, to a homogenizing treatment at a temperature from 350 to 550° C. from 1 to 48 hours; and subjecting the alloy ingot after applying the homogenizing treatment to both or any one of hot working and cold working, thereby allowing grains of intermetallic compounds with a diameter from 10 to 1000 nm to exist as Mn-base and Zr-base precipitates at a distribution density of 300,000 grains/mm$^2$ or more in the aluminum alloy material;

(11) the method of producing the aluminum alloy material for high-temperature/high-speed molding according to any one of (7) to (10), wherein the aluminum alloy material for high-temperature/high-speed molding is used for high-temperature/high-speed molding comprising the step of cooling the molded alloy to room temperature at a cooling rate of 20° C./min or more immediately after molding at a temperature from 200 to 550° C. and at a strain rate from $10^{-2}$ to 10/sec;

(12) a method of producing a molded article of an aluminum alloy, wherein the metal structure is made to have a subgrain structure by subjecting the aluminum alloy material for high-temperature/high-speed molding according to any one of (1) to (6) to high-temperature/high-speed molding at a temperature from 200 to 550° C. and at a strain rate from $10^{-2}$ to 10/sec followed by immediately cooling to room temperature at a cooling rate of 20° C./min or more;

(13) an aluminum alloy material of high-temperature/high-speed molding containing 2.0 to 8.0% of Mg (% by mass, the same hereinafter), 0.05 to 1.5% of Mn and 0.05 to 0.4% of Cr, and Fe being restricted to 0.4% or less and Si being restricted to 0.4% or less, with the balance being made of aluminum and inevitable impurities, the grain diameter of a Cr-base intermetallic compound formed by melt-casting being 20 μm or less, and grains of intermetallic compounds with a grain diameter in the range from 50 to 1,000 nm as Mn-base and Cr-base precipitates being present in a distribution density of 350,000 grains/mm$^2$ or more, the aluminum alloy material for high-temperature/high-speed molding being used for high-temperature/high-speed molding by subjecting the alloy material to cooling at a cooling rate of 20° C./min or more immediately after molding at a temperature range from 200 to 550° C. and at a strain rate from $10^{-2}$ to 10/sec;

(14) an aluminum alloy material for high-temperature/high-speed molding containing 2.0 to 8.0% of Mg (% by mass, the same hereinafter), 0.05 to 1.5% of Mn, 0.05 to 0.4% of Cr and 0.004 to 0.02% of Ti, Fe being restricted to 0.4% or less and Si being restricted to 0.4% or less, and further containing one or plural of 0.01 to 0.2% of V, 0.01 to 0.4% of Sc, 0.0001 to 0.05% of B and 0.0001 to 0.01% of Be, with the balance being made of aluminum and inevitable impurities, the grain diameter of a Cr-base intermetallic compound formed by melt-casting being 20 μm or less, and grains of intermetallic compounds with a grain diameter in the range from 50 to 1,000 nm as Mn-base and Cr-base precipitates being present in a distribution density of 350,000 grains/mm$^2$ or more, the aluminum alloy material for high-temperature/high-speed molding being used for high-temperature/high-speed molding by subjecting the alloy material to cooling at a cooling rate of 20° C./min or more immediately after molding at a temperature range from 200 to 550° C. and at a strain rate from $10^{-2}$ to 10/sec;

(15) an aluminum alloy material for high-temperature/high-speed molding containing 2.0 to 8.0% of Mg (% by mass, the same hereinafter), 0.05 to 1.5% of Mn, 0.05 to 0.4% of Cr and 0.004 to 0.02% of Ti, Fe being restricted to 0.4% or less and Si being restricted to 0.4% or less, and further containing one or plural of 0.01 to 0.2% of V, 0.01 to 0.4% of Sc, 0.0001 to 0.05% of B and 0.0001 to 0.01% of Be, and 0.05 to 1.0% by mass of Cu, with the balance being made of aluminum and inevitable impurities, the grain diameter of a Cr-base intermetallic compound formed by melt-casting being 20 μm or less, and grains of intermetallic compounds with a grain diameter in the range from 50 to 1,000 nm as Mn-base and Cr-base precipitates being present in a distribution density of 350,000 grains/mm$^2$ or more, the aluminum alloy material for high-temperature/high-speed molding being used for high-temperature/high-speed molding by subjecting the alloy material to cooling at a cooling rate of 20° C./min or more immediately after molding at a temperature range from 200 to 550° C. and at a strain rate from $10^{-2}$ to 10/sec;

(16) a method of producing an aluminum alloy material for high-temperature/high-speed molding, comprising at least the steps of: subjecting an aluminum alloy ingot to a homogenizing treatment at a temperature from 400 to 550° C. and for 1 to 24 hours; and subjecting the aluminum alloy ingot after the homogenizing treatment to both or any one of hot working and cold working, thereby controlling the grain diameter of a Cr-base intermetallic compound formed during melt-casting in the aluminum alloy material to 20 μm or less, and allowing the grains of the intermetallic compounds with a grain diameter from 50 to 1000 nm to exist at a distribution density of 350,000 grains/mm² or more in the aluminum alloy material as Mn-base and Cr-base precipitates, the aluminum alloy ingot containing 2.0 to 8.0% of Mg (% by mass, the same hereinafter), 0.05 to 1.5% of Mn and 0.05 to 0.4% of Cr, Fe being restricted to 0.4% or less and Si being restricted to 0.4% or less, with the balance being made of aluminum and inevitable impurities, the aluminum alloy material for high-temperature/high-speed molding being used for high-temperature/high speed molding comprising the step of cooling the aluminum alloy material to room temperature at a cooling rate of 20° C./min or more immediately after molding at a temperature from 200 to 550° C. and at a strain rate from $10^{-2}$ to 10/sec;

(17) a method of producing an aluminum alloy material for high-temperature/high-speed molding, comprising at least the steps of: subjecting an aluminum alloy ingot to a homogenizing treatment at a temperature from 400 to 550° C. and for 1 to 24 hours; and subjecting the aluminum alloy ingot after the homogenizing treatment to both or any one of hot working and cold working, thereby controlling the grain diameter of a Cr-base intermetallic compound formed during melt-casting in the aluminum alloy material to 20 μm or less, and allowing the grains of the intermetallic compounds with a grain diameter from 50 to 1000 nm to exist at a distribution density of 350,000 grains/mm² or more in the aluminum alloy material as Mn-base and Cr-base precipitates, the aluminum alloy ingot containing 2.0 to 8.0% of Mg (% by mass, the same hereinafter), 0.05 to 1.5% of Mn, 0.05 to 0.4% of Cr and 0.004 to 0.02% of Ti, Fe being restricted to 0.4% or less and Si being restricted to 0.4% or less, and further containing one or plural of 0.01 to 0.2% of V, 0.01 to 0.4% of Sc, 0.0001 to 0.05% of B and 0.0001 to 0.01% of Be, with the balance being made of aluminum and inevitable impurities, the aluminum alloy material for high-temperature/high-speed molding being used for high-temperature/high speed molding comprising the step of cooling the aluminum alloy material to room temperature at a cooling rate of 20° C./min or more immediately after molding at a temperature from 200 to 550° C. and at a strain rate from $10^{-2}$ to 10/sec;

(18) a method of producing an aluminum alloy material for high-temperature/high-speed molding, comprising at least the steps of: subjecting an aluminum alloy ingot to a homogenizing treatment at a temperature from 400 to 550° C. and for 1 to 24 hours; and subjecting the aluminum alloy ingot after the homogenizing treatment to both or any one of hot working and cold working, thereby controlling the grain diameter of a Cr-base intermetallic compound formed during melt-casting in the aluminum alloy material to 20 μm or less, and allowing the grains of the intermetallic compounds with a grain diameter from 50 to 1000 nm to exist at a distribution density of 350,000 grains/mm² or more in the aluminum alloy material as Mn-base and Cr-base precipitates, the aluminum alloy ingot containing 2.0 to 8.0% of Mg (% by mass, the same hereinafter), 0.05 to 1.5% of Mn, 0.05 to 0.4% of Cr and 0.004 to 0.02% of Ti, Fe being restricted to 0.4% or less and Si being restricted to 0.4% or less, and further containing one or plural of 0.01 to 0.2% of V, 0.01 to 0.4% of Sc, 0.0001 to 0.05% of B and 0.0001 to 0.01% of Be, and 0.05 to 1.0% by mass of Cu, with the balance being made of aluminum and inevitable impurities, the aluminum alloy material for high-temperature/high-speed molding being used for high-temperature/high speed molding comprising the step of cooling the aluminum alloy material to room temperature at a cooling rate of 20° C./min or more immediately after molding at a temperature from 200 to 550° C. and at a strain rate from $10^{-2}$ to 10/sec; and (19) a method of producing a molded article of an aluminum alloy comprising: subjecting the aluminum alloy material for high-temperature/high speed molding according to any one of (13) to (15) to high-temperature/high-speed molding at a temperature from 200 to 550° C. and at a strain rate from $10^{-2}$ to 10/sec, followed by immediate cooling to room temperature at a cooling rate of 20° C./min or more, to convert a metal structure into a subgrain structure.

The aluminum alloy materials for high-temperature/high speed molding according to (1) to (6) are collectively referred to a first embodiment of the present invention hereinafter.

The methods of producing an aluminum alloy material for high-temperature/high-speed molding according to (7) to (11) are collectively referred to a second embodiment of the present invention hereinafter.

The method of producing a molded article of an aluminum alloy according to (12) is referred to a third embodiment of the present invention hereinafter.

The aluminum alloy materials for high-temperature/high speed molding according to (13) to (15) are collectively referred to a fourth embodiment of the present invention hereinafter.

The methods of producing an aluminum alloy material for high-temperature/high-speed molding according to (16) to (18) are collectively referred to a fifth embodiment of the present invention hereinafter.

The method of producing a molded article of an aluminum alloy according to (19) is referred to a sixth embodiment of the present invention hereinafter.

The present invention means that all the embodiments from the first to sixth embodiments are included unless otherwise stated.

High-temperature/high-speed molding as used in the present invention refers to a molding method carried out in a temperature range from 250 to 550° C. and at a strain rate from $10^{-2}$ to 10/sec, and includes bulging taking advantage of a pressure of a fluid such as a gas, and arbitrary press-molding and die-molding methods.

The subgrain structure as used in the present invention refers to a structure having a proportion of the subgrain boundaries of 5% or more in average in all the grain boundaries as a sum of usual grain boundaries and subgrain boundaries, when the grain boundary with a grain boundary angle (the difference of orientation between adjoining grains) of 150 or more is classified into the usual grain boundary and the grain boundary with a grain boundary angle (the difference of orientation between adjoining grains) of less than 15° is classified into the subgrain boundary.

Other and further features and advantages of the invention will appear more fully from the following description, appropriately referring to the accompanying drawings.

BEST MODE FOR CARRYING OUT THE INVENTION

The present invention will be explained in detail below.
The reason for restricting the components of the alloy will be shown below.

The content of magnesium (Mg) is from 2.0 to 8.0 mass % in the present invention.

Mg is an essential element for endowing aluminum (Al) with high-temperature/high-speed moldability while it serves for improving the strength of the molded article by solid solution hardening. The alloy is not sufficiently elongated during high-temperature/high-speed molding while the strength of the molded article largely decreases when the amount of Mg is too small. On the other hand, hot workability is so largely decreases that it becomes difficult to produce a material for high-temperature/high-speed molding by hot working, when the amount of Mg is too large. Accordingly, the content of Mg in the alloy is preferably in the range from 2.4 to 7.6%.

The aluminum alloy material for high-temperature/high-speed molding of the first embodiment of the present invention will be described in detail below.

The reason for adding alloy component elements other than Mg that constitute the aluminum alloy material of the first embodiment of the present invention and the range of addition will be described below.

The content of manganese (Mn) is from 0.05 to 1.0 mass %, and the content of zirconium (Zr) is from 0.01 to 0.3 mass %.

Mn and Zr are essential elements in the first embodiment of the present invention. These elements uniformly and densely precipitate as grains of intermetallic compounds in the matrix by a homogenizing treatment that is usually applied immediately after casting. These elements stabilize subgrain structures formed in the crystal grain during high-temperature/high-speed molding, and prevent the subgrain structure from being extinguished by recrystallization during and after molding. This permits high-temperature/high-speed elongation to be increased while it serves for improving the strength of the molded article.

The grains of these intermetallic compounds are required to be distributed without leaving any gaps in the matrix. When the area that does not contain grains of the intermetallic compound is relatively large, subgrains in this region are not stabilized and grow as recrystallization nuclei. The subgrain structure is extinguished by growth of the subgrains into coarse recrystallized grains irrespective of the presence or absence of the grains of the intermetallic compound when the nuclei grow into a given size.

Containing Mn and Zr elements together in a proper amount permits the grains of the intermetallic compound to be distributed without any gap. The reason will be explained below. Mn added in a proper amount is segregated during solidification in the ingot of industrially produced aluminum alloy, and the concentration of Mn tends to be low in the initially solidified region and to be high in the finally solidified region. Consequently, distribution of grains of the Mn-base intermetallic compound is not uniform after the homogenizing treatment, in particular there are regions containing less grains of the Mn base intermetallic compound in the initially solidified region that contains particularly small amount of Mn. Contrary to Mn, while Zr is also segregated, the concentration of Zr tends to be high in the initially solidified region and to be low in the finally solidified region. Therefore, grains of the Zr-base intermetallic compound mainly precipitate in the region that contains less grains of the Mn base intermetallic compound. Consequently, grains of Mn-base or Zr-base intermetallic compound is dispersed in the matrix without any gaps by simultaneously adding Mn and Zr, and serves for stabilization of the subgrain structure in all the regions of the structure. When any one of Mn and Zr is added, the subgrain structure cannot be stabilized over the entire region of the structure since there remain regions that do not contain grains of the intermetallic compound.

It is preferable that the size of grains of the Mn-base and Zr-base intermetallic compounds is from 10 to 1,000 nm, and the distribution density of grains of the intermetallic compound is 300,000 grains/mm$^2$ or more in order to stabilize the subgrain structure effectively by the grains of the intermetallic compound. In the first embodiment of the present invention, grains of the intermetallic compound with a diameter from 10 to 1,000 nm as Mn-base and Zr-base precipitates exist in a distribution density of preferably 300,000 grains/mm$^2$ or more, more preferably 450,000 grains/mm$^2$ or more. The distribution density and diameter of the grains of the intermetallic compound in the aluminum alloy material may be measured by analyzing an observation photograph obtained by observing a thin film of the aluminum alloy sample with a transmission electron microscope. The precipitates may be confirmed to be grains of the Mn-base and Zr-base intermetallic compounds with an element analyzer equipped in the transmission electron microscope by element analysis of each precipitate.

The effect for stabilizing the subgrain structure may be poor when the content of Mn is 0.05 mass % or less and the content of Zr is 0.01 mass % or less. When the content of Mn is 1.0 mass % or more and the content of Zr is 0.3 mass % or more, on the other hand, giant intermetallic compounds are formed during casting, and high-temperature/high-speed moldability is largely decreased since the giant intermetallic compound serves as an origin of breakage during high-temperature/high-speed molding. Accordingly, the content of Mn is preferably from 0.2 to 0.8 mass %, and the content of Zr is preferably from 0.05 to 0.20 mass %.

The contents of silicon (Si) and iron (Fe) as essential elements in the first embodiment of the present invention are in the ranges from 0.06 to 0.4 mass % and from 0.06 to 0.4 mass %, respectively.

Fe and Si have an effect for enhancing high-temperature/high-speed moldability by fining crystal grains of the aluminum alloy material for high-temperature/high-speed molding. Specifically, the grain size of the aluminum alloy material for high-temperature/high-speed molding is fined by recrystallization using precipitates with a size from about 1 to 5 μm that comprise Fe and Si as principal components as nuclei during annealing after cold working as a production process of the aluminum alloy material for high-temperature/high-speed molding to result in an improvement of high-temperature/high-speed moldability thereafter. The effect becomes poor when the contents of Fe and Si are smaller than 0.06 mass %. When the contents of Fe and Si are larger than 0.4 mass %, on the other hand, high-temperature/high-speed moldability is largely deteriorated since giant intermetallic compounds that serve as origins of breakage during high-temperature/high-speed molding are formed during casting. Accordingly, the content of Si is preferably from 0.10 to 0.35 mass % and the content of Fe is preferably from 0.10 to 0.35 mass %.

The aluminum alloy of the first embodiment of the present invention may arbitrarily contains from 0.05 to 0.5 mass % of chromium (Cr), 0.01 to 0.1 mass % of vanadium (V) and 0.01 to 0.4 mass % of scandium (Sc).

Cr, V and Sc precipitate as grains of intermetallic compounds by homogenizing treatment as Mn and Zr do in the matrix, and exhibit effects for improving high-temperature/high-speed moldability as well as for improving the strength of the molded article by contributing to stabilization of the subgrain structure during high-temperature/high-speed molding. These effects become poor when the content of Cr is 0.05 mass % or less, the content of V is 0.01 mass % or less and the content of Sc is 0.01 mass % or less. On the other hand, high-temperature/high-speed moldability is largely deteriorated due to formation of giant intermetallic compounds during casting when the content of Cr is 0.5 mass % or more, the content of V is 0.1 mass % or more and the content of Sc is 0.4 mass % or more. The content of Cr is preferably from 0.05 to 0.35 mass %, the content of V is preferably from 0.02 to 0.08 mass % and the content of Sc is preferably from 0.05 to 0.25 mass % when at least one of them are contained in the alloy.

The aluminum alloy of the first embodiment of the present invention may arbitrarily contain from 0.001 to 0.1 mass % of titanium (Ti) and from 0.0001 to 0.05 mass % of boron (B). Ti and B make crystal grains of the ingot fine, and consequently improve high-temperature/high-speed moldability by fining crystal grains of the material before molding. The above-mentioned effects become poor when the content of Ti is 0.001 mass % or less and the content of B is 0.0001 mass % or less, while high-temperature/high-speed moldability largely decreases by forming giant precipitates when the content of Ti is 0.1 mass % or more and the content of B is 0.05 mass % or more. The content of Ti is preferably from 0.005 to 0.05 mass % and the content of B is preferably from 0.0005 to 0.005 mass % when at least one of them are contained in the alloy.

The aluminum alloy of the first embodiment of the present invention may arbitrarily contain from 0.0001 to 0.01 mass % of beryllium (Be). Be improves paintability and anodic oxidizability successively applied after molding by suppressing Mg on the surface of the aluminum alloy material for high-temperature/high-speed molding from being oxidized during high-temperature molding and by stabilizing the surface. The above-mentioned effect is not expressed when the content of Be is 0.0001 mass % or less, while the above-mentioned effect is saturated when the content of Be is 0.01 mass % or more, which is economically undesirable. The content of Be is preferably from 0.0005 to 0.005 mass % when the alloy contains Be.

The aluminum alloy of the first embodiment of the present invention may arbitrarily contain from 0.05 to 1.0 mass % of copper (Cu). Cu serves for improving the strength of the molded article as a result of precipitation in the matrix by maintaining the molded article at room temperature for 1 day or more, or by maintaining the molded article at a temperature of 100° C. or more for 1 hour or longer, after completing high-temperature/high-speed molding. When the strength is enhanced by precipitation of Cu as described above, the molded article after high-temperature/high-speed molding should be cooled to room temperature as promptly as possible. The cooling rate from the molding temperature to room temperature is preferably 20° C./min or more. The above-mentioned effect is not exhibited at a Cu content of 0.05 mass % or less. Corrosion resistance of the molded article is significantly deteriorated when the content of Cu is 1.0 mass % or more. Therefore, the content of Cu is preferably from 0.1 to 0.8 mass %, if necessary.

While the aluminum alloy material for high-temperature/high-speed molding according to the first embodiment of the present invention may satisfy the above-mentioned conditions as chemical components, the structure after molding preferably has the subgrain structure by molding under the following molding conditions.

The temperature for high-temperature/high-speed molding is within the range from 200 to 550° C. in the first to third embodiments of the present invention. When the molding temperature is less than 200° C., sufficient high-temperature/high-speed elongation is not obtained so that a molded article having a complex shape that is difficult to obtain by cold-press work is not obtained. When the molding temperature is 550° C. or more, on the other hand, the subgrain structure is extinguished by recrystallization during or after molding, since grains of Mn-base and Zr-base intermetallic compounds, which have been uniformly and densely precipitated in the matrix for stabilizing the grains of the subgrain structure formed during molding, are extinguished by being dissolved in the matrix during molding. The temperature for high-temperature/high-speed molding is preferably from 300 to 500° C.

The average strain rate during high-temperature/high-speed molding according to the first to third embodiments of the present invention is from $10^{-2}$ to 10/s. While molding at a strain rate of $10^{-2}$/s or less is technically possible, it is not economically advantageous since productivity becomes remarkably poor. On the other hand, since deformation rate is so high that the subgrain structure is not formed at a strain rate of 10/s or more, high-temperature/high-speed moldability is remarkably reduced to make it impossible to mold into a complex shape. Accordingly, the strain rate is preferably from $10^{-2}$ to 1/s.

The cooling rate to room temperature after high-temperature/high-speed molding is preferably 20° C./min or more. The subgrain is extinguished by recrystallization during the cooling process when the cooling rate is 20° C./min or less to consequently cause large deterioration of the strength of the molded article. The cooling rate to room temperature after high-temperature/high-speed molding is more preferably 40° C./min or more.

Good high-temperature/high-speed moldability is obtained while a high strength of the molded article is secured when the structure of the molded article is composed of the subgrain structure formed during high-temperature/high-speed molding without recrystallization in the cooling process during and after high-temperature/high-speed molding. The reason will be described below.

High-temperature/high-speed moldability is improved by the subgrain structure because rotation of respective subgrains in the fine subgrain structure formed in the crystal grains during high-temperature/high-speed molding interpose inter-grain deformation and grain boundary sliding that are principal deformation mechanism during high-temperature/high-speed molding. Accordingly, when the subgrain structure is extinguished by local recrystallization during high-temperature/high-speed molding, high-temperature/high speed elongation is largely decreased at the site of recrystallization that serves as an origin of breakage to cause large decrease in high-temperature/high speed elongation.

Improvement of the strength of the molded article by the subgrain structure is ascribed to strengthening of the inter-grain matrix by constituting the crystal grain with the subgrain. Yield stress tends to be increased as the grain diameter of the subgrain is smaller. Since the grain diameter of the subgrain is more reduced as the strain rate during molding is higher, it is recommended to mold at a high strain rate when the strength of the molded article is to be enhanced.

The method of producing the aluminum alloy material in the second embodiment of the present invention will be described below. The alloy material of the first embodiment of the present invention is able to be basically produced by the method usually employed in aluminum alloy manufacturing industries. In other words, the molten liquid of the aluminum alloy adjusted within the range of standard of the component in the first embodiment of the present invention is cast by appropriately selecting conventional melt-casting methods. The conventional melt-casting method includes, for example, a semi-continuous casting method (DC casting method) and a thin sheet continuous casting method (a roll-casting method).

The aluminum alloy ingot is then subjected to a homogenizing treatment. The homogenizing treatment is a process applied in order to permit grains of an intermetallic compound that contains transition elements such as Mn and Zr as components to be uniformly and densely precipitated in the matrix. The homogenizing treatment is preferably applied in the range from 350 to 550° C. for 1 to 48 hours, more preferably applied in the range from 400 to 530° C. for 8 to 24 hours. An aluminum alloy material for high-temperature/high-speed molding may be produced by subjecting the ingot to both or any one of hot working and cold working after appropriately applying facing treatment before or after the homogenizing treatment. The aluminum alloy may be appropriately subjected to intermediate annealing or final annealing, if necessary. Hot working and cold working as used herein may correspond to any one of rolling, extrusion, drawing and forging that are applied depending on the final shape of the aluminum alloy material for high-temperature/high-speed molding. Examples of the shape of the aluminum alloy material for high-temperature/high-speed molding include a sheet as well as a cylinder, a square tube and other hollow tubes having complicated shapes of the cross section.

The aluminum alloy material for high-temperature/high-speed molding of the fourth embodiment of the present invention will be described in detail below.

The reason for adding alloy component elements other than Mg that constitute the aluminum alloy material of the fourth embodiment of the present invention and the range of addition will be described below.

The content of Mn is from 0.05 to 1.5%, and the content of Cr is from 0.05 to 0.4%.

Mn and Cr are essential elements in the fourth embodiment of the present invention. Simultaneously added these elements are uniformly and densely precipitated as intermetallic compounds $(Mn, Cr)Al_4$ or $(Mn, Cr)Al_6$ in the matrix by the homogenizing treatment successively applied after casting, and stabilize the subgrain structure formed in the crystal grain during high-temperature/high speed molding. Consequently, the subgrain structure is protected from being extinguished by recrystallization during and after molding.

The precipitate has an effect for stabilizing the subgrain structure when the grain diameter of the precipitate is from 50 to 1,000 nm, preferably from 50 to 700 nm. No effect for stabilizing the subgrain structure is observed when the grain diameter is 50 nm or less since the contact area between the subgrain boundaries and the precipitates is quite small. The precipitates serve as nuclei of recrystallized grains by excessively accumulating strain around the precipitates when the grain diameter exceeds its upper limit, and induces recrystallization that causes the subgrain structure to be extinguished.

It is necessary for stabilizing the subgrain formed by high-temperature/high-speed molding that the precipitates are distributed without leaving any gaps. When the area containing no precipitates is relatively large, subgrains in this area are not stabilized and grow as recrystallization nuclei. The subgrain structure may be extinguished by growth of the subgrains into coarse recrystallized grains irrespective of the presence or absence of the grains of the intermetallic compound when the nuclei grow into a given size. Accordingly, the distribution density of the precipitate needs to be 350,000 grains/mm$^2$ or more, preferably 400,000 grains/mm$^2$ or more. When the distribution density is smaller than those described above, recrystallization occurs during molding or in the cooling process after molding due to insufficient stabilization effect of the recrystallized structure. Consequently, the subgrain structure is extinguished to cause a decrease of high-temperature/high-speed moldability as well as a decrease of the strength of the molded article.

The distribution density and grain diameter of the intermetallic compound in the aluminum alloy material may be measured by analyzing an observation photograph obtained by observing a thin film of the aluminum alloy sample under a transmission electron microscope. The precipitates may be confirmed to be grains of Mn-base and Cr-base intermetallic compounds with an element analyzer equipped to the transmission electron microscope by element analysis of each precipitate.

While Mn is precipitated as $MnAl_4$ and $MnAl_6$ by the homogenizing treatment when only Mn is added without adding Cr, most of the grains are precipitated with a grain diameter of 1,000 nm or more. Since the distribution density of the precipitates, which have a grain diameter from 50 to 1,000 nm and serve for stabilizing the subgrain structure, is 350,000 grains/mm$^2$ or less, these precipitates may be impossible to stabilize the subgrain structure. Rather, they are recrystallized during high-temperature/high-speed molding to cause large decrease of high-temperature/high-speed moldability. When only Cr is added without adding Mn, on the other hand, Cr is precipitated as $CrAl_7$ and $Mg_3Cr_2Al_{18}$. However, the precipitation density is smaller than 350,000 grains/mm$^2$ and the subgrain structure is not sufficiently stabilized.

The content of Mn is in the range from 0.05 to 1.5%, preferably from 0.1 to 1.5%, and the content of Cr is from 0.05 to 0.4%, preferably from 0.05 to 0.32%. The above-mentioned effect becomes poor when the contents of Mn and Cr are smaller than the lower limit, while the effect of restricting the content of Ti described below is cancelled when the contents of Mn and Cr are larger than the upper limit. During melt-casting too large amounts of Mn and Cr form Mn-base and Cr-base giant intermetallic compounds such as Al—Fe—Mn—Si and Al—Cr, which serve as origins of breakage during high-temperature/high-speed molding to cause deterioration of high-temperature/high-speed moldability as well as large decrease of fatigue characteristics of the molded article.

It is necessary to restrict the contents of Fe and Si in the aluminum alloy material of the fourth embodiment of the present invention, and the contents of Fe and Si are restricted to be 0.4% or less and 0.4% or less, respectively.

While Fe and Si are usually contained in the ingot of Al as impurities, they form Al—Fe—Mn—Si and Mg—Si intermetallic compounds when they are mingled into the alloy, and inhibit high-temperature/high-speed moldability. Accordingly, the permissible ranges of mingling of Fe and Si are 0.4% or less, preferably 0.35% or less. High-temperature/high-speed moldability is remarkably decreased when the respective contents exceed their upper limits.

While Ti is preferably added in the casting process for fining the crystal grains, the content is from 0.004% to 0.02%. A coarse Cr-base intermetallic compound is formed during melt-casting by adding Ti in an amount exceeding 0.02% even when the aluminum alloy contains Mn and Cr within the ranges prescribed in the fourth embodiment of the present invention. Mingling of the coarse intermetallic compound causes high-temperature/high-speed moldability to be decreased while fatigue characteristics of the molded article are decreased. Accordingly, while the content of Ti is restricted to be 0.02% or less for fining the crystal grains, the content is preferably from 0.015% or less to 0.004% or more. The effect of fining the crystal grains is reduced when the content is less than 0.004% to fail in obtaining better ingots.

The aluminum alloy material of the forth embodiment of the present invention may arbitrarily contains one or plural elements from 0.01 to 0.2% of V, from 0.01 to 0.4% of Sc, from 0.0001 to 0.05% of B and from 0.0001 to 0.01% of Be.

Both V and Sc precipitate in the matrix by the homogenizing treatment, and compensate the effect for stabilizing the subgrain structure of the Mn-base and Cr-base precipitates. The effect becomes poor when the content of V is 0.01% or less and the content of Sc is 0.01% or less. On the other hand, V and Sc form giant intermetallic compounds such as $Al_{10}V$ and $Al_3Sc$ during casting to cause large decrease of high-temperature/high-speed moldability.

It is preferable to use Zr having the same action and effect as V and Sc as an arbitrary constituting component. The preferable content of Zr is from 0.01 to 0.3%, and too large content of Zr tends to form a large intermetallic compound of $Al_3Zr$ that interfere with high-temperature/high speed molding.

B further enhances the effect of Ti for fining the crystal grain in the ingot when B is contained together with Ti. Consequently, high-temperature/high speed moldability is improved by fining crystal grains diameters contained before molding, The effect becomes poor when the content of B is 0.0001% or less, while a content of B of 0.05% or more permits large precipitates such as $AlB_2$ to be formed to cause remarkable decrease of high-temperature/high speed moldability.

Paintability and anodic oxidizability successively applied after molding are improved by adding Be since Be suppresses oxidation of Mg on the surface of the aluminum alloy for high-temperature/high speed molding during high-temperature/high speed molding and stabilizes the surface. The effect is not exhibited when the content of Be is 0.0001% or less. While the content of Be may be 0.01% or more, it is economically disadvantageous since the effect is saturated.

The aluminum alloy material of the fourth embodiment of the present invention may contain from 0.05 to 1.0% of Cu as an arbitrary constituting component. Cu serves for improving the strength of the molded article by precipitation in the matrix when the molded article is maintained at room temperature for 1 day or more, or maintained at 100° C. or more for 1 hour or more after completing high-temperature/high-speed molding. The molded article is required to be cooled to room temperature as soon as possible after high-temperature/high-speed molding for improving the strength of the molded article by precipitation of Cu. The cooling rate from the molding temperature to room temperature is preferably 20° C./min or more. The above-mentioned effect is not exhibited when the content of Cu is 0.05% or less, while corrosion resistance is largely deteriorated when the content of Cu is 1.0% or more. Accordingly, the content of Cu is preferably in the range from 0.1 to 0.5%.

While the aluminum alloy material for high-temperature/high-speed molding according to the fourth embodiment of the present invention may satisfy the above-mentioned chemical composition, it is important for the alloy of the fourth embodiment of the present invention to have features of the metal structure as will be described below in order to secure the excellent high-temperature/high-speed molding and the strength of the molded article and fatigue.

The grain diameter of the Cr-base intermetallic compound is preferably 20 μm or less. When the aluminum alloy material for high-temperature/high-speed molding contains intermetallic compounds with a diameter of 20 μm or more by forming Al—Cr-base giant intermetallic compounds during melt-casting, the intermetallic compound serves as origins of breakage by high-temperature/high-speed molding to cause a decrease of high-temperature/high-speed moldability as well as fatigue characteristics of the molded article.

Precipitates with a grain diameter from 50 to 10,000 nm are desirably present at a distribution density of 350,000 grains/$mm^2$ or more as the Mn—Cr-base precipitate. The grain diameter and distribution density of the precipitate are restricted by the same reason as has been described with respect to the contents of Mn and Cr.

The alloy according to the fourth embodiment of the present invention desirably satisfies the above-mentioned two features of the metal structure as well as the following features of the metal structure in order to enhance high-temperature/high-speed moldability and strength of the molded article. The metal structure is required to be composed of the subgrain structure by molding at a strain rate from $10^{-2}$ to 10/sec in the temperature range from 200 to 550° C. followed by cooling to room temperature at a cooling rate of 20° C./min or more. The reason of determining the molding conditions will be described below.

The molding temperature is in the range from 200 to 550° C., preferably in the range from 300 to 500° C. High-temperature/high-speed elongation is not attained when the molding temperature is too low, and a molded article having a complex shape that is difficult to obtain by cold molding work cannot be also obtained by high-temperature/high-speed molding. On the other hand, when the molding temperature is upper limit or more, grains of Mn-base and Cr-base intermetallic compound, which have been uniformly and densely precipitated in the matrix in order to stabilize the subgrain structure formed during molding, are extinguished by being dissolved in the matrix again. Consequently, the stabilizing effect of the subgrain structure is lost while the subgrains are recrystallized during or after molding to make the subgrain structure to be extinguished.

The average strain rate during high-temperature/high-speed molding is in the range from $10^{-2}$ to 10/sec. While molding at a strain rate of $10^{-2}$/sec or less is technically possible, it is not economically advantageous since productivity is significantly reduced. When the strain rate is 10/sec or more, on the other hand, the deformation rate is so large that the subgrain structure is not formed. Consequently, molding into a complex shape becomes impossible due to a remarkable decrease of high-temperature/high-speed moldability.

The method of producing the aluminum alloy material in the fifth and sixth embodiments of the present invention will be described below.

The alloy material according to the fourth embodiment of the present invention may be basically produced by a method usually employed in the production of wrought aluminum alloy. The molten liquid of the aluminum alloy, which is adjusted to have a composition within the range prescribed in the forth embodiment of the present invention by melting, is cast by appropriately selecting conventional melt-casting methods. Examples of the melt-casting method as used herein include a semi-continuous casting method (DC casting) and thin sheet continuous casting method (roll-casting method)

Then, the ingot of the aluminum alloy is subjected to the homogenizing treatment. The homogenizing treatment is necessary for allowing grains of Mn-base and Cr-base intermetallic compounds to be uniformly and densely precipitated in the matrix. The homogenizing treatment is applied at a temperature preferably in the range from 400 to 550° C., more preferably from 430 to 530° C., for 1 to 24 hours, preferably 8 to 12 hours. The aluminum alloy material for high-temperature/high-speed molding is produced by applying both or any one of hot working and cold working after appropriately applying a facing treatment before or after the homogenizing treatment. The aluminum alloy material may be appropriately subjected to either intermediate annealing or final annealing, if necessary. The hot working or cold working may be either rolling, extrusion, drawing or forging depending on the final shape of the aluminum alloy material for high-temperature/high speed molding to be produced.

The shape of the aluminum alloy material for high-temperature/high-speed molding produced may be any shape such as a sheet as well as a cylinder, rectangular pipe and other hollow pipes having a complex shape of the cross section.

High-temperature/high speed molding as used in the present invention refers to a mold-processing method applied in a temperature range from 200 to 550° C. at a strain rate from $10^{-2}$ to 10/sec, and includes a bulge molding taking advantage of a pressure of a fluid such as a gas, an arbitrary press molding and die molding.

The first to third embodiments of the present invention permit grains of intermetallic compounds of transition elements to be uniformly and densely dispersed, and provide aluminum alloy materials for high-temperature/high-speed molding having excellent high-temperature/high-speed moldability and a high strength after molding by permitting the subgrain structure to be stably present during and after molding. Mass production of a molded article having a complex shape that has been difficult to form by conventional cold press work may be possible by using the aluminum alloy material according to the first embodiment of the present invention.

According to the fourth to sixth embodiments of the present invention, the subgrain structure may be stabilized during and after molding by permitting grains of intermetallic compounds of transition element metals to be uniformly and densely dispersed in the matrix. Consequently, an aluminum alloy material for high-temperature/high-speed molding, which has excellent high-temperature/high-speed moldability and high strength and fatigue characteristics after molding, may be obtained. Mass production of a molded article having a complex shape that has been difficult to form by conventional cold press work may be possible by using the aluminum alloy material according to the fourth embodiment of the present invention.

EXAMPLES

The present invention will be described in more detail based on examples given below, but the invention is not meant to be limited by these.

Example 1-1

The aluminum alloy having each chemical composition shown in Table 1 was melted at 700° C., and was cast by the DC casting method. After subjecting the ingot obtained to the facing treatment, it was subjected to homogenizing treatment at 510° C. for 8 hours. Hot rolling process was started at 490° C. and completed at 280° C. with a sheet thickness of 5 mm. After applying intermediate annealing at 400° C. for 3 hours, the sheet was cold-rolled at a thickness of 1 mm. Finally a recrystallized structure was formed by annealing at 520° C. for 20 seconds, and the alloy sheet was used for the following tests.

TABLE 1

| | | Chemical composition (mass %) | | | | | | | | | | | | |
|---|---|---|---|---|---|---|---|---|---|---|---|---|---|---|
| | Alloy | Mg | Mn | Zr | Si | Fe | Cr | V | Sc | Ti | B | Be | Cu | Al |
| Example of this invention | 1 | 4.53 | 0.36 | 0.12 | 0.25 | 0.24 | — | — | — | — | — | — | — | Balance |
| | 2 | 2.35 | 0.47 | 0.19 | 0.11 | 0.13 | — | — | — | — | — | — | — | Balance |
| | 3 | 7.54 | 0.93 | 0.28 | 0.34 | 0.36 | — | — | — | — | — | — | — | Balance |
| | 4 | 5.12 | 0.12 | 0.18 | 0.21 | 0.23 | 0.20 | — | — | 0.02 | 0.0012 | — | — | Balance |
| | 5 | 3.98 | 0.48 | 0.02 | 0.08 | 0.07 | — | 0.08 | — | 0.01 | 0.0016 | — | — | Balance |
| | 6 | 6.85 | 0.75 | 0.28 | 0.38 | 0.36 | — | — | 0.35 | 0.02 | 0.0008 | — | — | Balance |
| | 7 | 5.31 | 0.13 | 0.25 | 0.24 | 0.14 | — | — | — | — | — | 0.0019 | — | Balance |
| | 8 | 3.65 | 0.62 | 0.14 | 0.07 | 0.09 | — | — | — | 0.01 | 0.0013 | — | 0.54 | Balance |
| Comparative example | 9 | 1.53 | 0.35 | 0.21 | 0.18 | 0.14 | — | — | — | 0.01 | 0.0014 | — | — | Balance |
| | 10 | 8.43 | 0.64 | 0.14 | 0.24 | 0.31 | — | — | — | 0.02 | 0.0011 | — | — | Balance |
| | 11 | 4.58 | 0.03 | 0.13 | 0.30 | 0.23 | — | — | — | — | — | — | — | Balance |
| | 12 | 4.51 | 0.35 | 0.008 | 0.21 | 0.25 | — | — | — | — | — | — | — | Balance |
| | 13 | 4.69 | 1.12 | 0.24 | 0.25 | 0.18 | — | — | — | 0.02 | 0.0008 | — | — | Balance |
| | 14 | 6.53 | 0.85 | 0.34 | 0.14 | 0.26 | — | — | — | 0.01 | 0.0013 | — | — | Balance |
| | 15 | 2.56 | 0.62 | 0.16 | 0.45 | 0.43 | — | — | — | 0.02 | 0.0014 | — | — | Balance |
| | 16 | 3.61 | 0.45 | 0.12 | 0.05 | 0.05 | — | — | — | 0.01 | 0.0011 | — | — | Balance |
| | 17 | 4.75 | 0.59 | 0.21 | 0.22 | 0.21 | 0.51 | 0.12 | 0.41 | 0.02 | 0.0010 | — | — | Balance |

* "—" in the table denotes below the detection limit.

Thin film samples with a thickness of about 0.3 μm were prepared from this test material, and the distribution density of the intermetallic compound was investigated with a transmission electron microscope. The results are summarized in Table 2. The sample with a distribution density of the intermetallic compound having a diameter from 10 to 1,000 nm of 300,000 grains/mm$^2$ or more was marked by "○", while the sample with a distribution density of less than 300,000/mm$^2$ was marked by "x". Distribution density of the intermetallic compound was not measured with respect to alloy No. 10 of the comparative example since preparation of the thin film sample was impossible.

TABLE 2

| | Alloy | Distribution density of grains of 10 to 1,000 nm of Mn-base and Zr-base intermetallic compounds (grains/mm$^2$) | Judgement of distribution feature |
|---|---|---|---|
| Example of this invention | 1 | 450,000 | ○ |
| | 2 | 620,000 | ○ |
| | 3 | 1,560,000 | ○ |
| | 4 | 420,000 | ○ |
| | 5 | 480,000 | ○ |
| | 6 | 1,230,000 | ○ |
| | 7 | 650,000 | ○ |
| | 8 | 750,000 | ○ |
| Comparative example | 9 | 390,000 | ○ |
| | 10 | — | — |
| | 11 | 200,000 | x |
| | 12 | 250,000 | x |
| | 13 | 1,480,000 | ○ |
| | 14 | 1,260,000 | ○ |
| | 15 | 770,000 | ○ |
| | 16 | 550,000 | ○ |
| | 17 | 820,000 | ○ |

Tensile test sheets (4 mm in width×15 mm in the length of parallel part) were prepared from the test material, and were subjected to a high temperature tensile test at 500° C. with a strain rate of $10^{-1}$/s. The high-temperature/high-speed elongation was measured and the results are summarized in Table 3. The test sheet was judged to be excellent in high-temperature/high-speed moldability when the test sheet showed high elongation at 150° C. or more.

Samples with a size of 300 mm square were cut from the cold-rolled sheet, and were subjected to high-temperature/high-speed blow molding using a small size blow molding machine that is used for molding by taking advantage of the pressure of an inert gas. A square-tubular die with a length of 250 mm and a height of 60 mm was used for the die. After setting the sample in the molding machine, the sample was heated at a molding temperature of 500° C. The pressure increasing rate of the inert gas was controlled so that the average strain rate is $10^{-1}$/s, and the sample was subjected to high-temperature/high-speed molding with a height of 60 mm. The sample was removed from the molding machine immediately after completing molding, and was cooled to room temperature at a cooling rate of 40° C./min or more. A test sheet prescribed in JIS 5 tensile test sheet was extracted from the center of the upper face to the roll direction of the square-tubular molded article, and was subjected to tensile test. 0.2% yield stress obtained is shown in Table 3.

Figure 1:
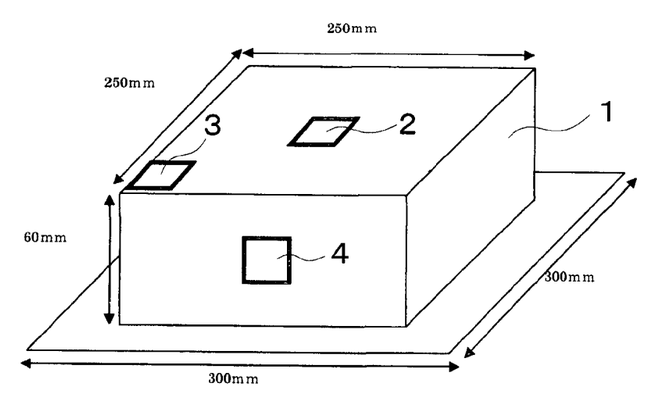
FIG. 1 schematically illustrates the portions for extracting samples for analyzing grain boundaries from a square-tubular molded article in Example 1.

For investigating whether the structure of these molded articles is composed of a subgrain structure, a square-tubular molded article 1 as shown by the schematic drawing in FIG. 1 was independently formed by high-temperature/high-speed blow molding at the same temperature and strain rate. Samples (10×10 mm) were extracted from the central portion 2 of the upper face, corner portion 3 of the upper face and rising portion 4 of the square-tubular molded article, and these samples were subjected to grain boundary analysis by the method described below. After mechanically polishing these samples to the central portion in the direction of thickness of the sheet, the surface was mirror-finished followed by electropolishing to expose the central portion of the sheet in the direction of thickness of the molded article. Then, the sample was set on a scanning electron microscope, which is equipped with an analyzer for electron back scattering diffraction image that is able to analyze the crystal grain boundary of the sample, and crystal grain boundaries of an area of 200×200 μm of the exposed portion were analyzed. Grain boundaries with a grain boundary angle of 15° or more were classified as usual crystal grain boundaries, while grain boundaries with an angle difference of less than 150 were classified as subgrain boundaries based of the analyzed data. The proportion of the subgrain boundary in all the combined grain boundaries of the usual grain boundary and subgrain boundary was calculated, and the proportion of subgrain boundary in each portion of the molded article was summarized in Table 3. The molded article was judged to be composed of the subgrain structure in this example when an average of the proportion of the subgrain boundary at three sampling portions was 5% or more, based on the proportion of the subgrain boundary formed during high-temperature/high-speed molding and many test data accumulated with respect to high-temperature/high-speed moldability and the strength after molding. In table 3, examples having the subgrain structure was marked by "○", and examples having no subgrain structure was marked by "x". When the sample sheet was not able to mold to a height of 60 mm that is the height of the square-tubular die due to insufficient high-temperature/high-speed elongation and the sheet was broken at the midway of molding, molding was immediately suspended and cooled at the same cooling rate as described above. Then, a sample (10×10 mm) was extracted from near the broken part, and was subjected to the grain boundary analysis. The proportion of the subgrain boundary was also shown in Table 3 as a reference.

TABLE 3

| | Alloy | High-temperature/high-speed elongation (%) | Judgement of high-temperature/high-speed moldability | Good or poor of square-tubular molding | Yield stress of molded article (MPa) | Proportion of subgrain boundary in all grain boundaries (%) | | | | | Judgement of subgrain structure |
|---|---|---|---|---|---|---|---|---|---|---|---|
| | | | | | | Central portion of upper face | Corner portion of upper face | Central portion of lateral face | Average at three sampling portions | Near the broken part | |
| Example of this invention | 1 | 196 | ○ | Good | 158 | 12.1 | 10.3 | 8.5 | 10.3 | — | ○ |
| | 2 | 157 | ○ | Good | 113 | 9.8 | 8.6 | 7.4 | 8.6 | — | ○ |
| | 3 | 215 | ○ | Good | 172 | 20.6 | 18.3 | 17.5 | 18.8 | — | ○ |
| | 4 | 204 | ○ | Good | 163 | 18.3 | 16.2 | 15.2 | 16.6 | — | ○ |
| | 5 | 185 | ○ | Good | 149 | 10.4 | 8.9 | 7.8 | 9.0 | — | ○ |
| | 6 | 195 | ○ | Good | 166 | 19.6 | 17.3 | 16.4 | 17.8 | — | ○ |
| | 7 | 202 | ○ | Good | 158 | 17.8 | 15.7 | 14.5 | 16.0 | — | ○ |
| | 8 | 179 | ○ | Good | 142 | 9.8 | 8.2 | 7.4 | 8.5 | — | ○ |
| Comparative example | 9 | 124 | x | Poor | — | — | — | — | — | 6.3 | — |
| | 10 | — | — | — | — | — | — | — | — | — | — |
| | 11 | 145 | x | Good | 143 | 0.2 | 0.1 | 0.1 | 0.1 | — | x |
| | 12 | 142 | x | Good | 104 | 0.3 | 0.2 | 0.2 | 0.2 | — | x |

TABLE 3-continued

| | | Judgement of | | Yield | Proportion of subgrain boundary in all grain boundaries (%) | | | | | |
|---|---|---|---|---|---|---|---|---|---|---|
| Alloy | High-temperature/ high-speed elongation (%) | high-temperature/ high-speed moldability | Good or poor of square-tubular molding | stress of molded article (MPa) | Central portion of upper face | Corner portion of upper face | Central portion of lateral face | Average at three sampling portions | Near the broken part | Judgement of subgrain structure |
| 13 | 114 | x | Poor | — | — | — | — | — | 8.3 | — |
| 14 | 113 | x | Poor | — | — | — | — | — | 9.6 | — |
| 15 | 121 | x | Poor | — | — | — | — | — | 8.2 | — |
| 16 | 144 | x | Good | 146 | 9.5 | 8.6 | 7.9 | 8.7 | — | ○ |
| 17 | 132 | x | Poor | — | — | — | — | — | 9.7 | — |

In Table 3, "—" shows not determined.

When the alloy materials 1 to 8 having compositions within the range of the first embodiment of the present invention are deformed at a temperature (500° C.) and strain rate ($10^{-1}$/s) within the range of the first, second and third embodiments, it was evident that the alloy material has good high-temperature/high-speed moldability since all the materials showed high-temperature/high-speed elongation of 150% or more. Likewise, each alloy material was able to mold at a height of 60 mm by high-temperature/high-speed blow molding using a square-tubular die at a temperature and stress rate within the range of the first, second and third embodiments of the present invention. The structure of the alloy material after cooling to room temperature at a cooling rate (40° C./min) within the range of the first, second and third embodiments of the present invention was shown to be the subgrain structure in all the alloy materials.

On the other hand, since the content of Mg in the alloy material 9 as Comparative example was below the prescribed range of the first embodiment, sufficient high-temperature/high-speed elongation cannot be attained, and the aluminum alloy sheet was broken before reaching a height of 60 mm in high-temperature/high-speed blow molding.

The Mg content of the alloy material 10 as Comparative example exceeded the prescribed range of the first embodiment of the present invention. Therefore, hot rollability was quite poor with cracks generated during rolling, so that a test material with a thickness of 1 mm could not be prepared.

The content of one of Mn and Zr that are to be added in a prescribed contents together was smaller than the range of the first embodiment of the present invention in the alloy materials 11 and 12 of Comparative example. Therefore, the distribution density of grains of Mn-base and Zr-base intermetallic compound was less than 30,000 grains/mm² with non-uniform distribution. Consequently, sufficient high-temperature/high-speed elongation cannot be attained as a result of extinction of the subgrain structure due to recrystallization in the region where the distribution density is low. This result supports the effectiveness of adding Mn and Zr together. The subgrain structure was entirely extinguished in the crystal structure after high-temperature/high-speed blow molding. The 0.2% yield stress was 15 MPa lower than the 0.2% yield stress of the alloy material 1 in the example of the present invention which has an approximately equal amount of Mg and in which the molded article was composed of a subgrain structure. This fact supports that the strength of the alloy material of the present invention is improved by maintaining the subgrain structure after molding.

Course intermetallic compounds were formed during casting since the amounts of addition of Mn, Zr, Si, Fe, Cr, V and Sc were larger than the range of the first embodiment of the present invention in the alloy materials 13, 14, 15 and 17 as Comparative examples. Good high-temperature/high-speed moldability cannot be attained due to remarkably low high-temperature/high-speed elongation since the course intermetallic compound serves as an origin of breakage during high-temperature/high-speed deformation. Accordingly, molding to a height of 60 mm was impossible by high-temperature blow molding.

High-temperature/high-speed elongation was insufficient in the alloy material 16 of the comparative example since the contents of Fe and Si were smaller than the range of the first embodiment of the present invention.

Example 1-2

A tensile test sheet (roll-tensile width: 4 mm, length of the parallel portion: 15 mm) was prepared from a test material with a thickness of 1 mm of the alloy material 1 in the example of the present invention, shown in Table 1 of Example 1-1 and was subjected to 150% of high-temperature/high-speed deformation at the temperature and strain rate shown in Table 4. The test sheet was immediately cooled to room temperature at the cooling rate shown in Table 4. A sample (10 mm×4 mm) for grain boundary analysis was extracted from a central region of the parallel part of the tensile test sheet after high-temperature/high-speed deformation to subject the sample to grain boundary analysis on the central surface in the direction of thickness by the method described in Example 1-1. The proportion of the subgrain boundaries in the total crystal grain boundaries was calculated, and the results are summarized in Table 4. As in Example 1-1, the crystal grain structure was judged to be composed of the subgrains when the proportion of the subgrain boundary was 5% or more. When the sample was broken at an elongation of less than 150% during high-temperature/high-speed deformation, the test was immediately suspended. The sample was removed and cooled to room temperature at a cooling rate described in Table 4. A sample for grain boundary analysis was extracted from near the broken part, and was subjected to grain boundary analysis by the same method as in Example 1-1.

TABLE 4

| | Conditions | Temperature (° C.) | Strain rate (1/s) | Good or poor of 150% of deformation (In the case of poor, breaking elongation is described.) | Cooling rate after high-temperature/ high-speed deformation (° C./min) | Proportion of subgrain boundary in all grain boundaries (%) | Judgement of subgrain structure |
|---|---|---|---|---|---|---|---|
| Example of this invention | 1 | 300 | $1.0 \times 10^{-1}$ | Good | 30 | 29.6 | ○ |
| | 2 | 360 | $1.0 \times 10^{-1}$ | Good | 30 | 25.0 | ○ |
| | 3 | 420 | $1.0 \times 10^{-2}$ | Good | 30 | 8.8 | ○ |
| | 4 | 420 | $1.0 \times 10^{1}$ | Good | 30 | 22.5 | ○ |
| | 5 | 500 | $1.0 \times 10^{-2}$ | Good | 30 | 6.4 | ○ |
| | 6 | 500 | $1.0 \times 10^{-1}$ | Good | 30 | 11.5 | ○ |
| | 7 | 500 | 1.0 | Good | 30 | 25.6 | ○ |
| | 8 | 540 | $1.0 \times 10^{-2}$ | Good | 50 | 5.5 | ○ |
| | 9 | 540 | 1.0 | Good | 50 | 18.6 | ○ |
| Comparative example | 10 | 190 | $1.0 \times 10^{-1}$ | Poor (53%) | 30 | 7.6 | ○ |
| | 11 | 560 | $1.0 \times 10^{-1}$ | Poor (83%) | 30 | 0.5 | x |
| | 12 | 500 | $3.0 \times 10^{1}$ | Poor (67%) | 30 | 1.2 | x |
| | 13 | 500 | $1.0 \times 10^{-1}$ | Good | 10 | 0.2 | x |

150% of high-temperature/high speed elongation was obtained under the conditions of 1 to 9 when the alloy material 1 having a composition within the range of the first embodiment of the present invention was molded at a temperature and strain rate within the ranges of the first, second and third embodiments, and it is clear that good high-temperature/high speed moldability is attained under the conditions within these ranges. In addition, it was confirmed that these samples were composed of the subgrain boundary structure from the grain boundary analysis after cooling the samples, immediately after deformation, to room temperature at a cooling rate within the ranges in the first, second and third embodiment of the present invention.

Meanwhile, conditions 10 to 13 as comparative examples will be described below, wherein the alloy material 1 having a composition within the range of the first embodiment of the present invention was subjected to high-temperature/high-speed molding under conditions out of the ranges of the second and third embodiments of the present invention. On the other hand, since deformation temperature is lower than the ranges of the second and third embodiments of the present invention in the condition 10, high-temperature/high-speed elongation is so low that good high-temperature/high-speed moldability is not obtained. Since the deformation temperature was higher than the ranges of the second and third embodiments of the present invention in the condition 11, the Mn-base and Zr-base intermetallic compound grains that serves for stabilizing the subgrain structure was dissolved again to cause a large decrease of high-temperature/high-speed elongation due to recrystallization during deformation. High-temperature/high-speed elongation was low without forming subgrain structure since the strain rate was too high in the condition 12. While 150% of high-temperature/high-speed elongation was attained in the condition 13, the cooling rate after high-temperature/high-speed deformation was lower than the ranges of the second and third embodiments of the present invention. Consequently, the subgrain structure formed during high-temperature/high-speed molding was extinguished by recrystallization during cooling, and the strength was not improved by the subgrain structure.

Example 2-1

Each aluminum alloy having the chemical components and composition shown in Table 5 was melted at 680° C., and was cast by the DC casting method. After subjecting each ingot obtained to facing treatment, it was subjected to homogenizing treatment at 510° C. for 8 hours. Then, hot rolling of the alloy was started at 490° C. and was ended at 280° C. at a thickness of 5 mm. Intermediate annealing was applied at 400° C. for 3 hours, followed by cold rolling to a thickness of 1 mm. Finally, the cold roll sheet was annealed at 520° C. for 20 seconds to form a recrystallized structure, and was used for the test material for the following tests.

Since the content of Mg in "the alloy 110" as a comparative example exceeded the range prescribed in the forth embodiment of the present invention, hot rollability was so poor that cracks were generated by rolling. Therefore, a test material with a thickness of 1 mm cannot be prepared, and the test thereafter were suspended.

Table 6 shows the results of investigation of the grain diameter of the intermetallic compound in the test material with an optical microscope, and results of investigation of the grain diameter and distribution density of precipitates, preparing a thin film sample with the thickness of about 0.3 μm, with a transmission electron microscope. The distribution feature was marked by "○" when the test sample satisfies both conditions that the grain diameter of the intermetallic compound is 15 μm or less and the distribution density of the precipitates having a grain diameter from 50 to 1,000 nm is 350,000 grains/mm² or more, and the distribution feature was marked by "x" when the grain diameter and distribution density do not satisfy both conditions.

TABLE 5

| | Chemical composition (mass %) | | | | | | | | | | | | |
|---|---|---|---|---|---|---|---|---|---|---|---|---|---|
| | Alloy | Mg | Mn | Cr | Ti | Zr | V | Sc | B | Be | Cu | Fe | Si | Al |
| Example of this invention | 101 | 4.30 | 0.45 | 0.14 | — | — | — | — | — | — | — | 0.21 | 0.24 | Balance |
| | 102 | 2.86 | 0.36 | 0.19 | — | — | — | — | — | — | — | 0.22 | 0.23 | Balance |
| | 103 | 7.54 | 1.24 | 0.29 | 0.015 | — | — | — | 0.0003 | — | — | 0.21 | 0.21 | Balance |
| | 104 | 4.46 | 0.29 | 0.08 | 0.017 | 0.10 | — | — | 0.0010 | — | — | 0.22 | 0.23 | Balance |

TABLE 5-continued

| | Alloy | Chemical composition (mass %) | | | | | | | | | | | | |
|---|---|---|---|---|---|---|---|---|---|---|---|---|---|---|
| | | Mg | Mn | Cr | Ti | Zr | V | Sc | B | Be | Cu | Fe | Si | Al |
| | 105 | 3.36 | 0.57 | 0.21 | 0.013 | — | 0.05 | — | 0.0014 | — | — | 0.21 | 0.25 | Balance |
| | 106 | 6.19 | 0.64 | 0.31 | 0.010 | — | — | 0.11 | 0.0011 | — | — | 0.25 | 0.22 | Balance |
| | 107 | 4.03 | 0.31 | 0.08 | 0.013 | — | — | — | 0.0012 | 0.0016 | — | 0.21 | 0.21 | Balance |
| | 108 | 5.56 | 0.64 | 0.25 | 0.004 | — | — | — | 0.0013 | — | 0.57 | 0.23 | 0.20 | Balance |
| Comparative example | 109 | 1.46 | 0.39 | 0.11 | — | — | — | — | — | — | — | 0.23 | 0.21 | Balance |
| | 110 | 8.20 | 0.66 | 0.15 | — | — | — | — | — | — | — | 0.23 | 0.25 | Balance |
| | 111 | 4.16 | 0.02 | 0.13 | — | — | — | — | — | — | — | 0.24 | 0.22 | Balance |
| | 112 | 4.33 | 0.31 | 0.02 | — | — | — | — | — | — | — | 0.23 | 0.23 | Balance |
| | 113 | 4.69 | 1.61 | 0.21 | — | — | — | — | 0.0008 | — | — | 0.21 | 0.24 | Balance |
| | 114 | 6.47 | 0.75 | 0.45 | — | — | — | — | 0.0013 | — | — | 0.22 | 0.20 | Balance |
| | 115 | 3.89 | 0.62 | 0.16 | 0.025 | — | — | — | 0.0014 | — | — | 0.23 | 0.24 | Balance |
| | 116 | 3.61 | 0.45 | 0.12 | 0.009 | 0.35 | 0.23 | 0.44 | 0.0011 | — | — | 0.24 | 0.22 | Balance |

\* "—" in the table denotes below the detection limit.

TABLE 6

| | Alloy | Diameter of intermetallic compound (μm) | Size of precipitates (nm) | Distribution density of the precipitates having a size of 50 to 1,000 nm (grains/mm$^2$) | Judgement of distribution feature |
|---|---|---|---|---|---|
| Example of this invention | 101 | <12 | 70 to 600 | 1,200,000 | ○ |
| | 102 | <11 | 60 to 500 | 520,000 | ○ |
| | 103 | <15 | 80 to 700 | 1,500,000 | ○ |
| | 104 | <14 | 50 to 200 | 420,000 | ○ |
| | 105 | <11 | 80 to 700 | 1,340,000 | ○ |
| | 106 | <10 | 70 to 500 | 1,300,000 | ○ |
| | 107 | <8 | 50 to 100 | 460,000 | ○ |
| | 108 | <12 | 70 to 600 | 1,450,000 | ○ |
| Comparative example | 109 | <11 | 60 to 100 | 440,000 | ○ |
| | 110 | — | — | — | — |
| | 111 | <11 | 30 to 100 | 330,000 | x |
| | 112 | <8 | 80 to 300 | 210,000 | x |
| | 113 | <22 | 90 to 800 | 1,750,000 | x |
| | 114 | <25 | 80 to 700 | 1,690,000 | x |
| | 115 | <23 | 60 to 600 | 1,620,000 | x |
| | 116 | <24 | 60 to 500 | 1,430,000 | x |

A tensile test sheet (4 mm in width×15 mm in the length of parallel portion) was prepared from each of these test material, and was used for high temperature tensile test at 500° C. at a strain rate of $10^{-1}$/sec (in accordance with JIS Z2241 except the temperature condition) to investigate high-temperature/high-speed elongation. The results are summarized in Table 7. The test material succeeded in attaining 150% or more of high-temperature/high-speed elongation was judged to have good high-temperature/high-speed moldability in this invention, and was marked by "○".

A molding sheet with a size of 300 mm square was cut from each cold roll sheet, and was molded by high-temperature/high-speed blow molding using a small size blow molding machine that takes advantage of the pressure of an inert gas. A square-tubular die with a length of 250 mm and a height of 60 mm was used for the die. The molding sheet was set on the molding machine, heated at a molding temperature of 500° C., and the sheet was molded by high-temperature/high speed molding to a height of 60 mm by controlling the pressure increasing rate of the inert gas so that average strain rate is about $10^{-1}$/s. A square-tubular molded article was removed from the molding machine immediately after molding, and was cooled to room temperature at a cooling rate of 40° C./min. As shown in FIG. 1, a JIS 5 tensile strength test sheet was extracted from the central portion 2 of the upper face in the elongation direction of the square-tubular molded article 1 obtained, and was subjected to a tensile test (in accordance with JIS Z2241). Table 7 shows 0.2% yield stress and tensile strength obtained from the result.

Likewise, fatigue test sheets was prepared from the central portion 2 of the upper face of plural square-tubular molded articles, and were subjected to a fatigue test under pulsating tension (in accordance to JIS Z2273). The fatigue strength after $1 \times 10^7$ times of the tests is shown in Table 7. A fatigue ratio defined by the proportion of the fatigue strength after $1 \times 10^7$ times of the tests relative to the initial tensile strength is shown in Table 7. The fatigue strength of the molded article was judged to be insufficient when the fatigue ratio is less than 0.4, and the sample was marked by "x". On the other hand, the fatigue strength of the molded article was judged to be sufficient when the fatigue ratio is 0.4 or more, and the sample was marked by "○".

TABLE 7

| | Alloy | High-temperature/high-speed elongation (%) | Judgement of high-temperature/high-speed moldability | 0.2% yield stress of molded article (MPa) | Tensile Strength of molded article (MPa) | Fatigue strength of the molded article (MPa) | Fatigue ratio (Fatigue strength/Tensile Strength) | Judgement of fatigue characteristics |
|---|---|---|---|---|---|---|---|---|
| Example of this invention | 101 | 196 | ○ | 152 | 291 | 140 | 0.47 | ○ |
| | 102 | 173 | ○ | 109 | 244 | 110 | 0.45 | ○ |
| | 103 | 213 | ○ | 181 | 312 | 165 | 0.52 | ○ |
| | 104 | 186 | ○ | 144 | 297 | 135 | 0.45 | ○ |
| | 105 | 177 | ○ | 116 | 240 | 110 | 0.45 | ○ |
| | 106 | 190 | ○ | 172 | 318 | 155 | 0.48 | ○ |
| | 107 | 179 | ○ | 120 | 258 | 120 | 0.46 | ○ |
| | 108 | 192 | ○ | 175 | 321 | 160 | 0.49 | ○ |
| Comparative example | 109 | 139 | x | 78 | 169 | 95 | 0.56 | ○ |
| | 110 | — | — | — | — | — | — | — |
| | 111 | 142 | x | 134 | 264 | 130 | 0.46 | ○ |
| | 112 | 138 | x | 136 | 263 | 125 | 0.47 | ○ |
| | 113 | 125 | x | 152 | 306 | 100 | 0.32 | x |
| | 114 | 131 | x | 167 | 319 | 105 | 0.32 | x |
| | 115 | 143 | x | 122 | 243 | 75 | 0.31 | x |
| | 116 | 137 | x | 113 | 246 | 70 | 0.28 | x |

In order to determine whether the structure of the molded article is composed of a subgrain structure, a square-tubular molded article was independently produced by high-temperature/high-speed blow molding under the same temperature and strain rate condition as described above. As shown in FIG. 1, samples with a size of 10×10 mm were extracted from the central portion 2 of the upper face, corner portion 3 of the upper face and central portion 4 of the side face, respectively, of the square-tubular molded article 1, and these samples were subjected to grain boundary analysis by the method described below.

After mechanical polishing of the samples to the ventral portion in the direction of thickness, the polished sample was mirror-finished by final polishing followed by allowing the central portion in the direction of thickness of the sheet to be exposed by electropolishing. The sample was set on a scanning electron microscope equipped with an analyzer for electron back scattering diffraction image that is able to analyze the crystal grain boundary of the sample, and grain boundaries of an area of 200×200 μm of the exposed portion were analyzed.

The grain boundary with a grain boundary angle of 15° or more was classified as a usual "crystal grain boundary", while grain boundary with an angle difference of less than 15° was classified as a "subgrain boundary". The proportion of the subgrain boundary in all the grain boundaries as a sum of the usual crystal grain boundaries and subgrain boundaries was calculated. The proportion of the subgrain boundary for each portion of the molded article is summarized in Table 8.

The molded article was judged to be composed of the subgrain structure when the average proportion at three portions of subgrains where the samples was extracted is 5% or more, based on many test data accumulated with respect to the relation between the proportion of the subgrain boundary formed during high-temperature/high-speed molding, and high-temperature/high-speed moldability and strength after molding. The molded article composed of the subgrain structure with 5% or more of average proportion was marked by "○", and the molded article not composed of the subgrain structure with 5% or less of average proportion was marked by "x".

TABLE 8

| | | Proportion of subgrain boundary in all grain boundaries (%) | | | | |
|---|---|---|---|---|---|---|
| | Alloy | Central portion of upper face | Corner portion of upper face | Central portion of lateral face | Average at three sampling portions | Judgement of subgrain structure |
| Example of this invention | 101 | 13.5 | 12.8 | 12.0 | 12.8 | ○ |
| | 102 | 8.6 | 8.1 | 7.4 | 8.0 | ○ |
| | 103 | 19.3 | 18.4 | 17.7 | 18.5 | ○ |
| | 104 | 11.8 | 11.5 | 10.5 | 11.3 | ○ |
| | 105 | 10.5 | 10.2 | 9.7 | 10.1 | ○ |
| | 106 | 17.8 | 18.2 | 16.8 | 17.6 | ○ |
| | 107 | 10.6 | 10.3 | 9.7 | 10.2 | ○ |
| | 108 | 15.2 | 14.9 | 14.2 | 14.8 | ○ |
| Comparative example | 109 | 6.2 | 5.1 | 5.3 | 5.5 | ○ |
| | 110 | — | — | — | — | — |
| | 111 | 0.3 | 0.3 | 0.2 | 0.3 | x |
| | 112 | 0.4 | 0.3 | 0.3 | 0.3 | x |
| | 113 | 12.1 | 11.9 | 10.5 | 11.5 | ○ |
| | 114 | 18.3 | 17.6 | 17.0 | 17.6 | ○ |
| | 115 | 10.3 | 9.7 | 9.1 | 9.7 | ○ |
| | 116 | 9.8 | 9.5 | 8.6 | 9.3 | ○ |

The grain diameters of the intermetallic compounds in "the alloy 101 to the alloy 108" within the composition range of the forth embodiment of the present invention were 20 μm or less. Precipitates with a grain diameter from 50 to 1,000 nm were distributed with a distribution density of 350,000 grains/mm$^2$ or more as Mn-base and Cr-base precipitates. These alloys satisfied the requirements of the fourth embodiment of the present invention with respect to both the grain diameter of the intermetallic compound and distribution configuration of the precipitate. It was revealed that these alloys showed 150% or more of high-temperature/high speed elongation and has good high-temperature/high speed moldability when being deformed at 500° C. and at strain rate ($10^{-1}$/s). The structure after cooling to room temperature at a cooling rate of 40° C./min was the subgrain structure in all the alloys.

High-temperature/high-speed elongation of 150% or more cannot be obtained, on the other hand, in "the alloy 109" as a comparative example since the content of Mg is below the prescribed range or less of the forth embodiment of the present invention, and it was impossible to produce a test material from "the alloy 110" as described before.

One of the amount of addition of Mn and Cr, which are to be added in a prescribed amount together, in "the alloy 111" and "the alloy 112" in the comparative example was smaller than the range of the fourth embodiment of the present invention. Consequently, since the distribution density of the precipitate with a grain diameter from 50 to 1,000 nm was 350,000 grains/$mm^2$ or less, accordingly, the subgrain structure formed during high-temperature/high-speed molding was not stabilized to cause extinction of the subgrain structure due to recrystallization, and sufficient high-temperature/high-speed elongation cannot be attained. This result supports the effectiveness of adding appropriate amounts of Mn and Cr together. The subgrain structure was entirely extinguished in the crystal structure after high-temperature/high-speed blow molding. While the tensile strength is basically determined by the amount of addition of Mg that is responsible for solid solution hardening in the test material containing Mg as a principal addition element, 0.2% yield strength and tensile strength of the molded articles of "the alloy 111" and "the alloy 112" are about 15 MPa lower than those of the molded article of the alloy 101 of the present invention that contains approximately the same amount of Mg but is composed of the subgrain structure. This supports the fact that the strength of "the alloy 101" as an example of the present invention is improved by maintaining the subgrain structure even after molding.

High-temperature/high-speed elongation was low and good high-temperature/high-speed moldability cannot be obtained in "the alloy 113" and "the alloy 114" and in the alloy 116 of the comparative example, because the amounts of addition of Mn and Cr were larger than the range of the forth embodiment of the present invention in the former alloys while the contents of Zr, V and Sc were so large to form coarse intermetallic compounds during casting, and the coarse intermetallic compound serves as an origin of breakage during high-temperature/high-speed deformation in the latter alloy. Elongation necessary for molding was relatively small even when molding was possible, and the molded articles of these alloys contain many coarse intermetallic compounds. Since the fatigue ratio is as low as 0.4 or less as shown in Table 7, it is difficult to use these alloys for members that suffer from repeated stress such as transportation machines.

While the amounts of addition of Mn and Cr as the transition elements for forming coarse intermetallic compounds did not exceed the range of the fourth embodiment of the present invention in "the alloy 115" of the comparative example, formation of the Cr-base intermetallic compound was enhanced during melt-casting since the amount of addition of Ti was large for fining crystal grains during casting. Consequently, the Cr-base intermetallic compound with a grain diameter of 20 μm or more was mingled into the material. Accordingly, good high-temperature/high-speed moldability was not attained, and fatigue characteristics were poor with the fatigue ratio of the molded article of as low as 0.4 or less.

Example 2-2

A tensile test sheet (roll-tensile width: 4 mm, length of the parallel portion: 15 mm) was prepared from a test material with a thickness of 1 mm of "the alloy 101", which was prepared in Example 2-1 and shown in Table 5. The test sheet was subjected to 150% of high-temperature/high-speed deformation at the temperature and stain rate shown in Table 9. The deformed sheet was immediately cooled to room temperature at the cooling rate shown in Table 9. Samples (10 mm×4 mm) for grain boundary analysis was extracted from the central region of the parallel portion of the tensile test sheet after high-temperature/high speed deformation. Grain boundary analysis on the central face in the direction of thickness was performed by the method described in Example 2-1, and the proportion of the subgrain boundary in the total grain boundary was calculated. The results are shown in Table 9.

The sheet having a proportion of the subgrain boundary of 5% or more was judged to be composed of the subgrain structure as in Example 2-1, and was marked by "○". When the sample sheet was broken at an elongation less than 150% in high-temperature/high-speed deformation, the test was immediately suspended. The sample sheet was removed, cooled to room temperature at a cooling rate described in Table 9, a sample for grain boundary analysis was extracted from near the broken portion, and grain boundary analysis was performed by the same method as described above.

TABLE 9

|  | Conditions | Temperature (° C.) | Strain rate (1/s) | Good or poor of 150% of deformation (In the case of bad, breaking elongation is described.) | Cooling rate after high-temperature/high-speed deformation (° C./min) | Proportion of subgrain boundary in all grain boundaries (%) | Judgement of subgrain structure |
|---|---|---|---|---|---|---|---|
| Example of this invention | 101 | 300 | $1.0 \times 10^{-2}$ | Good | 30 | 16.4 | ○ |
|  | 102 | 420 | $1.0 \times 10^{1}$ | Good | 30 | 21.4 | ○ |
|  | 103 | 500 | $1.0 \times 10^{-2}$ | Good | 30 | 6.8 | ○ |
|  | 104 | 500 | $1.0 \times 10^{-1}$ | Good | 30 | 12.3 | ○ |
|  | 105 | 500 | 1.0 | Good | 30 | 22.3 | ○ |
|  | 106 | 540 | $1.0 \times 10^{-2}$ | Good | 50 | 6.1 | ○ |
|  | 107 | 540 | 1.0 | Good | 50 | 17.6 | ○ |
| Comparative example | 108 | 190 | $1.0 \times 10^{-2}$ | Poor (53%) | 30 | 10.3 | ○ |
|  | 109 | 560 | $1.0 \times 10^{-1}$ | Poor (84%) | 30 | 0.3 | x |
|  | 110 | 500 | $3.0 \times 10^{1}$ | Poor (67%) | 30 | 0.8 | x |
|  | 111 | 500 | $1.0 \times 10^{-1}$ | Good | 10 | 0.1 | x |

In "the conditions 101 to 107" when "the alloy 101" having a composition within the range of the fourth embodiment of the present invention were molded at the temperature and strain rate within the range of the fifth and sixth embodiments of the present invention, 150% of high-temperature/high-speed elongation was attained, and it was shown good high-temperature/high-speed moldability is attainable within these conditions. It was also revealed that these samples are composed of 6% or more of the subgrain boundary structure from the results of grain boundary analysis performed after cooling the sample to room temperature at a cooling rate within the range of the fifth and sixth embodiments of the present invention.

Meanwhile, molding under "the conditions 108 to 111" as comparative examples will be described below, wherein "the alloy 101" having a composition within the range of the fourth embodiment of the present invention was subjected to high-temperature/high-speed molding under the conditions out of the range of the fifth and sixth embodiment of the present invention. Since the deformation temperature is lower than the range in the fifth and sixth embodiments of the present invention in "the condition 108", high-temperature/high-speed elongation is low and good high-temperature/high-speed moldability is not obtained. The deformation temperature is higher than the range of the fifth and sixth embodiment of the present invention in the condition 109, the effect for stabilizing the subgrain structure is extinguished due to re-dissolution of Mn-base and Cr-base precipitates that are responsible for stabilization of the subgrain structure. Consequently, high-temperature/high-speed elongation was largely decreased due to recrystallization during deformation. The subgrain structure is not formed and high-temperature/high-speed elongation is low without forming the subgrain structure since the strain rate is too high in "the condition 110". While 150% of high-temperature/high-speed elongation was observed under "the condition 111", recrystallization occurred during cooling since the cooling rate after high-temperature/high-speed deformation was lower than the range in the fifth and sixth embodiments of the present invention. Consequently, the subgrain structure formed during high-temperature/high-speed molding was extinguished due to recrystallization during cooling, and the strength was not improved by the subgrain structure.

Having described our invention as related to the present embodiments, it is our intention that the invention not be limited by any of the details of the description, unless otherwise specified, but rather be construed broadly within its spirit and scope as set out in the accompanying claims.

This non-provisional application claims priority under 35 U.S.C. §119 (a) on Patent Application No. 2006-005406 filed in Japan on Jan. 12, 2006, and Patent Application No. 2006-005415 filed in Japan on Jan. 12, 2006, each of which is entirely herein incorporated by reference.

The invention claimed is:

1. An aluminum alloy sheet for high-temperature/high-speed molding consisting of 2.0 to 8.0 mass % of Mg, 0.05 to 1.0 mass % of Mn, 0.01 to 0.3 mass % of Zr, 0.06 to 0.35 mass % of Si and 0.23 to 0.35 mass % of Fe, with the balance being made of aluminum and inevitable impurities;
    wherein intermetallic compounds with a diameter from 10 to 1,000 nm as Mn-base and Zr-base precipitates exist at a distribution density of 300,000 grains/mm$^2$ or more.

2. The aluminum alloy sheet for high-temperature/high-speed molding according to claim 1, which is used for high-temperature/high-speed molding in which the aluminum alloy sheet is cooled to room temperature at a cooling rate of 20° C./min or more immediately after molding at a temperature from 200 to 550° C. and at a strain rate from $10^{-2}$ to 10/sec.

3. A method of producing the aluminum alloy sheet of claim 1, said method comprising at least the steps of:
    subjecting an aluminum alloy ingot consisting of 2.0 to 8.0 mass % of Mg, 0.05 to 1.0 mass % of Mn, 0.01 to 0.3 mass % of Zr, 0.06 to 0.35 mass % of Si and 0.23 to 0.35 mass % of Fe, with the balance being made of aluminum and inevitable impurities, to a homogenizing treatment at a temperature from 350 to 550° C. from 1 to 48 hours; and
    subjecting the alloy ingot after applying the homogenizing treatment to both or any one of hot working and cold working, thereby allowing grains of intermetallic compounds with a diameter from 10 to 1000 nm to exist as Mn-base and Zr-base precipitates at a distribution density of 300,000 grains/mm$^2$ or more in the aluminum alloy material.

4. The method of producing the aluminum alloy sheet according to claim 3, wherein the aluminum alloy material for high-temperature/high-speed molding is used for high-temperature/high-speed molding comprising the step of cooling the molded alloy to room temperature at a cooling rate of 20° C./min or more immediately after molding at a temperature from 200 to 550° C. and at a strain rate from $10^{-2}$ to 10/sec.

5. An aluminum alloy sheet for high-temperature/high-speed molding consisting of 2.0 to 8.0 mass % of Mg, 0.05 to 1.0 mass % of Mn, 0.01 to 0.3 mass % of Zr, 0.06 to 0.35 mass % of Si and 0.23 to 0.35 mass % of Fe, and further containing one or plural elements of 0.01 to 0.1 mass % of V, 0.01 to 0.4 mass % of Sc, 0.001 to 0.1 mass % of Ti, 0.0001 to 0.05 mass % of B and 0.0001 to 0.01 mass % of Be, with the balance being made of aluminum and inevitable impurities;
    wherein intermetallic compounds with a diameter from 10 to 1,000 nm as Mn-base and Zr-base precipitates exist at a distribution density of 300,000 grains/mm$^2$ or more.

6. The aluminum alloy sheet for high-temperature/high-speed molding according to claim 5, which is used for high-temperature/high-speed molding in which the aluminum alloy sheet is cooled to room temperature at a cooling rate of 20° C./min or more immediately after molding at a temperature from 200 to 550° C. and at a strain rate from $10^{-2}$ to 10/sec.
    wherein intermetallic compounds with a diameter from 10 to 1,000 nm as Mn-base and Zr-base precipitates exist at a distribution density of 300,000 grains/mm$^2$ or more.

7. A method of producing the aluminum alloy sheet of claim 5, said method comprising at least the steps of:
    subjecting an aluminum alloy ingot consisting of 2.0 to 8.0 mass % of Mg, 0.05 to 1.0 mass % of Mn, 0.01 to 0.3 mass % of Zr, 0.06 to 0.35 mass % of Si and 0.23 to 0.35 mass % of Fe, and further contains one or plural elements of 0.01 to 0.1 mass % of V, 0.01 to 0.4 mass % of Sc, 0.001 to 0.1 mass % of Ti, 0.0001 to 0.05 mass % of B and 0.0001 to 0.01 mass % of Be, with the balance being made of aluminum and inevitable impurities, to a homogenizing treatment at a temperature from 350 to 550° C. from 1 to 48 hours; and
    subjecting the alloy ingot after applying the homogenizing treatment to both or any one of hot working and cold working, thereby allowing grains of intermetallic compounds with a diameter from 10 to 1000 nm to exist as Mn-base and Zr-base precipitates at a distribution density of 300,000 grains/mm$^2$ or more in the aluminum alloy material.

8. The method of producing the aluminum alloy material according to claim 7, wherein the aluminum alloy material for high-temperature/high-speed molding is used for high-temperature/high-speed molding comprising the step of cooling the molded alloy to room temperature at a cooling rate of 20° C./min or more immediately after molding at a temperature from 200 to 550° C. and at a strain rate from $10^{-2}$ to 10/sec.

9. An aluminum alloy sheet of high-temperature/high-speed molding consisting of 2.0 to 8.0 mass % of Mg, 0.05 to 1.5 mass % of Mn, 0.14 to 0.4 mass % of Cr, 0.21 to 0.35 mass % of Fe, 0.20 to 0.35 mass % of Si, with the balance being made of aluminum and inevitable impurities,
the grain diameter of a Cr-base intermetallic compound formed by melt-casting being 20 μm or less, and grains of intermetallic compounds with a grain diameter in the range from 50 to 1,000 nm as Mn-base and Cr-base precipitates being present in a distribution density of 350,000 grains/mm$^2$ or more,
the aluminum alloy sheet being used for high-temperature/high-speed molding by subjecting the alloy sheet to cooling at a cooling rate of 20° C./min or more immediately after molding at a temperature range from 200 to 550° C. and at a strain rate from $10^{-2}$ to 10/sec.

10. A method of producing an aluminum alloy sheet of claim 9, comprising at least the steps of:
subjecting an aluminum alloy ingot to a homogenizing treatment at a temperature from 400 to 550° C. and for 1 to 24 hours; and
subjecting the aluminum alloy ingot after the homogenizing treatment to both or any one of hot working and cold working, thereby controlling the grain diameter of a Cr-base intermetallic compound formed during melt-casting in the aluminum alloy material to 20μm or less, and allowing the grains of the intermetallic compounds with a grain diameter from 50 to 1000 nm to exist at a distribution density of 350,000 grains/mm$^2$ or more in the aluminum alloy material as Mn-base and Cr-base precipitates,
the aluminum alloy ingot consisting of 2.0 to 8.0% of Mg (% by mass, the same hereinafter), 0.05 to 1.5% of Mn and 0.14 to 0.4% of Cr, 0.21 to 0.35% of Fe and 0.20 to 0.35% of Si, with the balance being made of aluminum and inevitable impurities,
the aluminum alloy material for high-temperature/high-speed molding being used for high-temperature/high speed molding comprising the step of cooling the aluminum alloy material to room temperature at a cooling rate of 20° C./min or more immediately after molding at a temperature from 200 to 550° C. and at a strain rate from $10^{-2}$ to 10/sec.

11. An aluminum alloy sheet for high-temperature/high-speed molding consisting of 2.0 to 8.0 mass % of Mg, 0.05 to 1.5 mass % of Mn, 0.14 to 0.4 mass % of Cr and 0.004 to 0.02 mass % of Ti, 0.21 to 0.35 mass % of Fe, 0.20 to 0.35 mass % of Si, and further containing one or plural of 0.01 to 0.2 mass % of V, 0.01 to 0.4 mass % of Sc, 0.0001 to 0.05 mass % of B and 0.0001 to 0.01 mass % of Be, with the balance being made of aluminum and inevitable impurities,
the grain diameter of a Cr-base intermetallic compound formed by melt-casting being 20 μm or less, and grains of intermetallic compounds with a grain diameter in the range from 50 to 1,000 nm as Mn-base and Cr-base precipitates being present in a distribution density of 350,000 grains/mm$^2$ or more,
the aluminum alloy sheet being used for high-temperature/high-speed molding by subjecting the alloy sheet to cooling at a cooling rate of 20° C./min or more immediately after molding at a temperature range from 200 to 550° C. and at a strain rate from $10^{-2}$ to 10/sec.

12. A method of producing an aluminum alloy sheet of claim 11, comprising at least the steps of: subjecting an aluminum alloy ingot to a homogenizing treatment at a temperature from 400 to 550° C. and for 1 to 24 hours; and subjecting the aluminum alloy ingot after the homogenizing treatment to both or any one of hot working and cold working, thereby controlling the grain diameter of a Cr-base intermetallic compound formed during melt-casting in the aluminum alloy material to 20 μm or less, and allowing the grains of the intermetallic compounds with a grain diameter from 50 to 1000 nm to exist at a distribution density of 350,000 grains/mm$^2$ or more in the aluminum alloy material as Mn-base and Cr-base precipitates,
the aluminum alloy ingot consisting of 2.0 to 8.0% of Mg (% by mass, the same hereinafter), 0.05 to 1.5% of Mn, 0.14 to 0.4% of Cr and 0.004 to 0.02% of Ti, 0.21 to 0.35% of Fe and 0.20 to 0.35% of Si, and further containing one or plural of 0.01 to 0.2% of V, 0.01 to 0.4% of Sc, 0.0001 to 0.05% of B and 0.0001 to 0.01% of Be, with the balance being made of aluminum and inevitable impurities,
the aluminum alloy material for high-temperature/high-speed molding being used for high-temperature/high speed molding comprising the step of cooling the aluminum alloy material to room temperature at a cooling rate of 20° C./min or more immediately after molding at a temperature from 200 to 550° C. and at a strain rate from $10^{-2}$ to 10/sec.

* * * * *